(12) United States Patent
Uematsu et al.

(10) Patent No.: US 9,724,702 B2
(45) Date of Patent: Aug. 8, 2017

(54) METHOD FOR MANUFACTURING PULVERIZED MATERIAL AND VIBRATING PULVERIZER

(75) Inventors: Takafumi Uematsu, Wakayama (JP);
Tomoya Wada, Wakayama (JP);
Kazutomo Osaki, Wakayama (JP);
Naoki Nojiri, Sakai (JP)

(73) Assignee: KAO CORPORATION, Tokyo (JP)

( * ) Notice: Subject to any disclaimer, the term of this patent is extended or adjusted under 35 U.S.C. 154(b) by 869 days.

(21) Appl. No.: 14/234,992

(22) PCT Filed: Jul. 12, 2012

(86) PCT No.: PCT/JP2012/067854
§ 371 (c)(1),
(2), (4) Date: Jan. 24, 2014

(87) PCT Pub. No.: WO2013/015132
PCT Pub. Date: Jan. 31, 2013

(65) Prior Publication Data
US 2014/0145017 A1    May 29, 2014

(30) Foreign Application Priority Data

Jul. 25, 2011   (JP) .................................. 2011-162498
Dec. 8, 2011    (JP) .................................. 2011-269042

(51) Int. Cl.
*B02C 17/14*   (2006.01)
*B02C 17/20*   (2006.01)
(Continued)

(52) U.S. Cl.
CPC .............. *B02C 17/14* (2013.01); *B02C 17/20* (2013.01); *C08B 1/00* (2013.01); *C08B 37/003* (2013.01); *C08L 1/02* (2013.01); *C08L 5/08* (2013.01)

(58) Field of Classification Search
CPC . B02C 17/14; B02C 17/20; C08L 1/02; C08L 5/08; C08B 37/003; C08B 1/00
See application file for complete search history.

(56) References Cited

U.S. PATENT DOCUMENTS 2,323,544 A    7/1943   Kiesskalt et al.
3,933,316 A    1/1976   Jones
(Continued)

FOREIGN PATENT DOCUMENTS

CN    2215351 Y    12/1995
CN    2484115 Y    4/2002
(Continued)

OTHER PUBLICATIONS

English Machine translation for JP-61-230756-A (identified on the machine translation as "Published patent application 1986-230756"), published Oct. 15, 1986.
(Continued)

*Primary Examiner* — Mark Rosenbaum
(74) *Attorney, Agent, or Firm* — Birch, Stewart, Kolasch & Birch, LLP

(57) ABSTRACT

A particle diameter of a raw material to be pulverized can be decreased within a short time period. A vibration mill includes a container having therein a columnar space with a central axis of the columnar space being almost horizontal while the container is held so as to be vibratable in a direction of within a plane that is almost perpendicular to the central axis, a cylindrical medium disposed in the container so as to be vibratable, and a plurality of pulverizing media disposed inside the cylindrical medium so as to be vibratable. The ratio of an inner diameter of the cylindrical medium in contact with the pulverizing medium to an outer diameter of the pulverizing medium is 2.1 or more. The integrated value of volumes of the pulverizing media rela-
(Continued)

tive to a space volume inside the cylindrical medium in contact with the pulverizing medium is more than 25%.

20 Claims, 3 Drawing Sheets

(51) Int. Cl.
  *C08B 1/00* (2006.01)
  *C08B 37/08* (2006.01)
  *C08L 1/02* (2006.01)
  *C08L 5/08* (2006.01)

(56) References Cited

U.S. PATENT DOCUMENTS

| | | | |
|---|---|---|---|
| 5,921,479 | A | 7/1999 | Doenges et al. |
| 2011/0003341 | A1 | 1/2011 | Nojiri et al. |

FOREIGN PATENT DOCUMENTS

| | | |
|---|---|---|
| CN | 101406857 A | 4/2009 |
| GB | 1232088 A | 5/1971 |
| JP | 61-230756 A | 10/1986 |
| JP | 1-163441 U | 11/1989 |
| JP | 10-152501 A | 6/1998 |
| JP | 2004-188833 A | 7/2004 |
| JP | 2007-38206 A | 2/2007 |
| JP | 2008-93590 A | 4/2008 |
| JP | 2008-132469 A | 6/2008 |
| JP | 4160108 B1 | 10/2008 |
| JP | 4160109 B1 | 10/2008 |
| JP | 2009-171951 A | 8/2009 |
| JP | 2009-233542 A | 10/2009 |
| JP | 2011-12134 A | 1/2011 |

OTHER PUBLICATIONS

Extended European Search Report for European Application No. 12817322.6, dated Feb. 5, 2015.
Office Action issued in the corresponding Japanese Patent Application No. 2012-162892 on Apr. 5, 2016.
Japanese Office Action, issued on Sep. 20, 2016, for Japanese Application No. 2012-162892.
PCT/ISA/210—International Search Report mailed on Oct. 9, 2012, issued in PCT/JP2012/067854.
Chinese Office Action and Search Report, issued Aug. 20, 2014, for Chinese Application No. 201280035802.5.

METHOD FOR MANUFACTURING PULVERIZED MATERIAL AND VIBRATING PULVERIZER

FIELD OF THE INVENTION

The present invention relates to a method for manufacturing a pulverized material.

BACKGROUND OF THE INVENTION

It is generally well known that to make particle diameter of a material smaller thereby increasing the specific surface area thereof not only enhances a reactivity of this material but also changes its properties relating to a handling characteristic such as bulk density. Among the methods for making particle diameter of a material smaller, a pulverizing process may be mentioned as one of the most basic unit processes thereof, and this process has been used for pulverization of minerals since early times, and for pulverization of an inorganic material such as calcium carbonate; and now it is used in very wide variety of fields.

Generally, a material having a crystalline structure has poor reactivity, so that its use has been difficult. In a certain pulverization process, a material can be made amorphous simultaneously with pulverization, whereby the reactivity thereof can be enhanced dramatically. As a result, various kinds of functional groups can be bonded by a chemical reaction to the amorphous material thereby obtained so that the value of this material may be enhanced dramatically.

In recent years, a biomass material is drawing increasing attention as the concern with the environmental problem is increasing; and a finely pulverized cellulose and an amorphous cellulose that are obtained by pulverizing a cellulose-containing raw material are being used as a raw material for a cellulose derivative such as a cellulose ether, and as an industrial raw material such as a cosmetic and a food stuff, a biomass material. For this, various kinds of pulverizers to be used for pulverization of the above-mentioned cellulose-containing raw materials have been proposed. For example, in Patent Document 1, it is disclosed that, after a wooden material is crushed, this crushed material is pulverized by a vibration mill provided with a upper first pulverizing trunk in which rods are accommodated as a pulverizing medium and with a lower second pulverizing trunk in which balls are accommodated as a pulverizing medium so that 90% or more by weight of the powders thereof can be pulverized to particle diameter of 100 μm or less by using this pulverization method. In the Patent Documents 2 and 3, a method to produce a cellulose which is made to amorphous by treating a cellulose-containing raw material having bulk density of 100 to 500 kg/m$^3$ by a pulverizer such as a vibrating mill filled with balls or rods is disclosed.

In addition, in Patent Document 4, an apparatus to pulverize a wooden biomass wherein a plurality of thick plate discs having projections are inserted as the pulverizing medium into a cylindrical container whereby vibrating this cylindrical container up and down for pulverization is disclosed as a pulverizer to pulverize the particles further finely; and in Patent Document 5, similarly to the above, an apparatus to pulverize a wooden biomass wherein a rotating body having a plurality of projections and a hole in the axis direction in its central part is inserted as the pulverizing medium into a cylindrical container whereby revolving this cylindrical container for pulverization is disclosed as a pulverizer to pulverize the particles further finely.

Patent Document 1: Japanese Patent Laid-Open Publication No. 2004-188833
Patent Document 2: Japanese Patent No. 4160108
Patent Document 3: Japanese Patent No. 4160109
Patent Document 4: Japanese Patent Laid-Open Publication No. 2008-93590
Patent Document 5: Japanese Patent Laid-Open Publication No. 2009-233542

SUMMARY OF THE INVENTION

Problems to be Solved by the Invention

However, by the pulverizing methods using the pulverizers described in the Patent Documents 1 to 4, fine pulverization of a cellulose-containing raw material or making this material amorphous within a short period of time, for example, within 10 minutes, has been difficult. In the Patent Document 5, even though it is proposed to enhance to a certain degree the pulverizing rate for fine pulverization, the pulverization is effected only in the cylindrical container and the projection parts of the rotating body, so that it may be easily anticipated that the pulverization efficiency relative to the volume thereof becomes lower as the size of the apparatus increases. In addition, to form the projection parts in the rotating body is difficult and costly; and on top of it, there is a problem of decrease in the pulverization efficiency by abrasion of the projection parts.

The problems to be solved by the present invention is to provide a method for manufacturing a pulverized material by using a vibration mill capable of making particle diameter of a material to be pulverized smaller within a short period of time.

Means for Solving the Problems

Inventors of the present invention found that the above-mentioned problems can be solved by using a vibration mill, wherein the vibration mill is provided with:

a container having therein a columnar space with the central axis of the columnar space being disposed so as to be almost horizontal while the container is held so as to be vibratable in a direction of within a plane that is almost perpendicular to the said central axis, a cylindrical medium disposed in the container so as to be vibratable, and a plurality of pulverizing media disposed inside the cylindrical medium so as to be vibratable; and in the vibration mill, the ratio of an inner diameter of the cylindrical medium in contacted with the pulverizing medium to an outer diameter of the pulverizing medium is above a certain value, and the integrated value of volumes of the pulverizing media is above a certain value relative to a space volume inside the cylindrical medium in contacted with the pulverizing medium.

That is, the present invention provides the following (1) and (2).

(1) A method for manufacturing a pulverized material, wherein the method uses a vibration mill provided with:

a container having therein a columnar space with a central axis of the columnar space being disposed so as to be almost horizontal while the container being held so as to be vibratable in a direction of within a plane that is almost perpendicular to the central axis, a cylindrical medium disposed in the container so as to be vibratable, and a plurality of pulverizing media disposed inside the cylindrical medium so as to be vibratable; in the vibration mill, the ratio of an inner diameter of the cylindrical medium in contacted with the pulverizing medium to an outer diameter of the pulverizing medium (inner diameter of the cylindrical medium in contacted with the pulverizing medium/outer diameter of the pulverizing medium) is 2.1 or more, and the integrated value of volumes of the pulverizing media is more than 25% relative to a space volume inside the cylindrical medium in contacted with the pulverizing medium; and the method has a pulverizing treatment process of a raw material to be pulverized by vibrating the container after the raw material to be pulverized is introduced into the container of the vibration mill.

(2) A vibration mill, wherein the vibration mill is provided with:

a container having therein a columnar space with a central axis of the columnar space being disposed so as to be almost horizontal while the container being held so as to be vibratable in a direction of within a plane that is almost perpendicular to the central axis, a cylindrical medium disposed in the container so as to be vibratable, and a plurality of pulverizing media disposed inside the cylindrical medium so as to be vibratable; and in the vibration mill, the ratio of an inner diameter of the cylindrical medium in contacted with the pulverizing medium to an outer diameter of the pulverizing medium (inner diameter of the cylindrical medium in contacted with the pulverizing medium/outer diameter of the pulverizing medium) is 2.1 or more, and the integrated value of volumes of the pulverizing media is more than 25% relative to a space volume inside the cylindrical medium in contacted with the pulverizing medium.

Effect of the Invention

According to the vibration mill and the method for manufacturing a pulverized material by using the pulverizer of the present invention, the particle diameter of a raw material to be pulverized can be made smaller within a short period of time, and also crystallinity of a crystalline raw material to be pulverized can be lowered within a short period of time, so that productivity to manufacture a pulverized material can be enhanced.

MODES FOR CARRYING OUT THE INVENTION

The method for manufacturing a pulverized material of the present invention is characterized by that the method uses a vibration mill provided with:

a container having therein a columnar space with a central axis of the columnar space being disposed so as to be almost horizontal while the container being held so as to be vibratable in a direction of within a plane that is almost perpendicular to the central axis of the column (hereinafter, this container is sometimes referred to as "pulverizing container"), a cylindrical medium disposed in the container so as to be vibratable, and a plurality of pulverizing media disposed inside the cylindrical medium so as to be vibratable; in the vibration mill, the ratio of an inner diameter of the cylindrical medium in contacted with the pulverizing medium to an outer diameter of the pulverizing medium (inner diameter of the cylindrical medium in contacted with the pulverizing medium/outer diameter of the pulverizing medium) is 2.1 or more, and the integrated value of volumes of the pulverizing media is more than 25% relative to a space volume inside the cylindrical medium in contacted with the pulverizing medium; and the method has a pulverizing treatment process of a raw material to be pulverized by vibrating the container after the raw material to be pulverized is introduced into the container of the vibration mill.

1. Vibration Mill

The first and the second embodiments of the vibration mill of the present invention will be explained by using respective drawings.

1-1. First Embodiment

Figure 1:
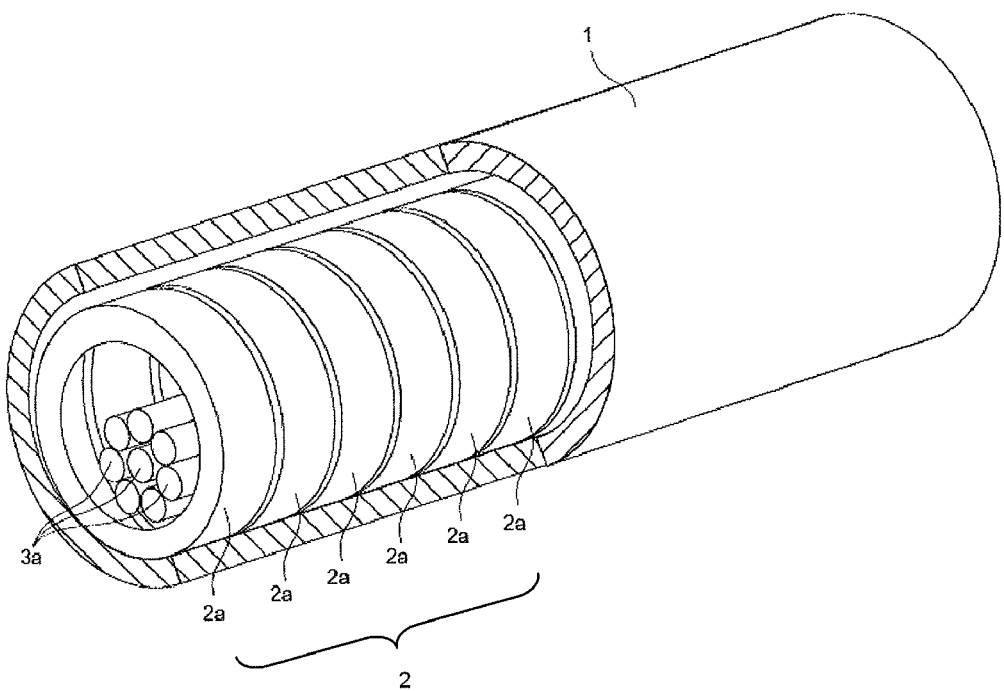
FIG. 1 This is a diagrammatic perspective view showing one example in which the columnar rod-like medium 3a is used as the pulverizing medium in the vibration mill according to the first embodiment of the present invention.
Figure 2:
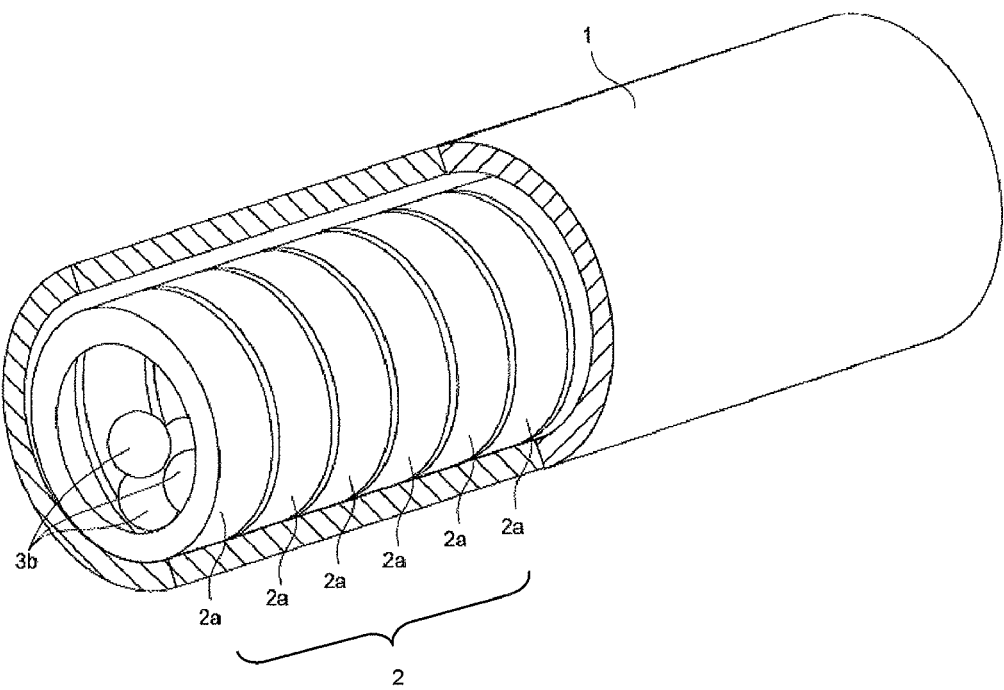
FIG. 2 This is a diagrammatic perspective view showing one example in which the spherical medium 3b is used as the pulverizing medium in the vibration mill according to the first embodiment of the present invention.

One example of the first embodiment of the vibration mill of the present invention is shown in FIG. 1 and FIG. 2. The vibration mill according to the first embodiment of the present invention is provided with the pulverizing container 1 having therein a columnar space with a central axis of the columnar space being disposed so as to be almost horizontal while the container being held so as to be vibratable in the direction of within a plane that is almost perpendicular to the central axis of the column, the cylindrical medium 2 disposed in the pulverizing container 1 so as to be vibratable, and a plurality of the pulverizing media 3a and/or 3b disposed inside the cylindrical medium 2. In FIG. 1 and FIG. 2, the cylindrical medium 2 is divided in the direction of the axis thereof; and 2a is one of the cylindrical media obtained by dividing the cylindrical medium 2 in the direction of the axis thereof. In FIG. 1 and FIG. 2, in order to show the cylindrical medium 2 that is disposed inside the pulverizing container 1 as well as the pulverizing media 3a and/or 3b, a part of the pulverizing container 1 and the holding part of the pulverizing container are not shown in these drawings.

As to the pulverizing medium used in the present invention, for example, a rod-like medium and a spherical medium may be mentioned. In FIG. 1, the columnar rod-like medium 3a is shown as the pulverizing medium; and in FIG. 2, the spherical medium 3b is shown. Hereinafter, these rod-like medium 3a and/or spherical medium 3b are sometimes collectively referred to as "pulverizing medium 3".

In the vibration mill according to the first embodiment of the present invention, the ratio of the inner diameter of the cylindrical medium 2 in contacted with the pulverizing medium 3 to the outer diameter of the pulverizing medium 3 (inner diameter of the cylindrical medium 2/outer diameter of the pulverizing medium 3) is 2.1 or more, and the integrated value of volumes of the pulverizing media 3 is more than 25% relative to a space volume inside the cylindrical medium 2 in contacted with the pulverizing medium 3.

1-1-1. Pulverizing Container

The pulverizing container 1 has a columnar space therein with the central axis of the columnar space in the static state being in the almost horizontal direction while the container is held so as to be vibratable in the direction of within a plane that is almost perpendicular to the central axis. Here, the term "central axis of the columnar space" means a virtual straight line passing through the centers of two circular bottom planes of the column; and the term "in the almost horizontal direction" means that direction of the angle to the horizontal plane is in the range of −10 to 10° (hereinafter, the term "in the almost horizontal direction" is sometimes referred to as simply "horizontal"). The material of construction of the pulverizing container 1 is not particularly restricted; and illustrative example thereof includes metals and metal alloys such as an iron, an iron steel, and a stainless steel. These may be treated by a treatment such as quenching.

In order to pulverize uniformly, the space inside the pulverizing container 1 is preferably in the shape of column whose bottom plane is in an almost circular shape such as a true circle and an ellipse.

Size of the pulverizing container 1 is not particularly restricted. For example, the inner diameter of the pulverizing container 1 is preferably 50 mm or more, more preferably 80 mm or more, or still more preferably 100 mm or more; and preferably 1500 mm or less, more preferably 1200 mm or less, or still more preferably 1000 mm or less. Also, the inner diameter of the pulverizing container 1 is preferably in the range of 50 to 1500 mm, more preferably in the range of 80 to 1200 mm, or still more preferably in the range of 100 to 1000 mm. The length of the columnar space in the direction of the central axis thereof inside the pulverizing container 1 (hereinafter, this axis is sometimes referred to as "axis of the pulverizing container") is preferably 100 mm or more, more preferably 120 mm or more, or still more preferably 150 mm or more; and preferably 10000 mm or less, more preferably 8000 mm or less, or still more preferably 6000 mm or less. Also, the length of the columnar space in the direction of the axis of the pulverizing container inside the pulverizing container 1 is preferably in the range of 100 to 10000 mm, more preferably in the range of 120 to 8000 mm, or still more preferably in the range of 150 to 6000 mm. In the present invention, the inner diameter of the pulverizing container 1 means twice as long as the shortest distance from the axis of the pulverizing container 1 to the inner surface of the pulverizing container 1, wherein, in the case that the bottom plane of the columnar inner space is a true circle, this is equal to the diameter of the true circle, while in the case of an ellipse, this is equal to the minor diameter of the ellipse.

During pulverization, the pulverizing container 1 vibrates in the direction of within the plane that is almost perpendicular to the axis of the pulverizing container 1. In the present invention, vibration of the pulverizing container 1 includes not only the movement with which the axis of the pulverizing container 1 draws the track of a straight line but also the movement with which the track of an ellipse or a true circle is drawn. The vibration frequency and the vibration amplitude of the pulverizing container 1 are not particularly restricted; however, when the vibration frequency and the vibration amplitude are increased, rates of acceleration rendered to the pulverizing container 1, to the cylindrical medium 2 disposed inside the pulverizing container, and to the pulverizing medium 3 disposed inside the cylindrical medium 2 can be increased, so that the pulverizing rate of the raw material to be pulverized can be enhanced.

Accordingly, the vibration frequency of the pulverizing container 1 is preferably 8 Hz or more, more preferably 10 Hz or more, or still more preferably 12 Hz or more. In order to enhance the pulverizing rate of the raw material to be pulverized, the vibration amplitude of the pulverizing container 1 is preferably 5 mm or more, more preferably 6 mm or more, or still more preferably 7 mm or more.

On the other hand, in view of the load in the apparatus, the vibration frequency of the pulverizing container 1 is preferably 40 Hz or less, more preferably 35 Hz or less, or still more preferably 30 Hz or less. Also, the vibration amplitude of the pulverizing container 1 is preferably 25 mm or less, more preferably 20 mm or less, or still more preferably 18 mm or less.

In the case that the track of vibration of the axis of the pulverizing container 1 does not draw a straight line, vibration of the pulverizing container 1 shows the vibration amplitude s with a plurality of different lengths. In the present invention, the vibration amplitude of vibration of the pulverizing container 1 means the longest vibration amplitude among the vibration amplitudes of vibration of the pulverizing container 1; and thus, in the case that the track drawn by vibration of the axis of the pulverizing container 1 is an ellipse, the vibration amplitude means the major axis of the ellipse.

The vibration mechanism of the pulverizing container 1 comprises a vibrating motor, an eccentric weight or an eccentric vibration exciter, and so forth; and these mechanisms are the same as the heretofore known mechanisms. These mechanisms have been disclosed in, for example, in addition to the Japanese Patent Laid-Open Publication No. 2004-188833 as mentioned before, the Japanese Patent Laid-Open Publication No. 2008-93534, the Japanese Patent Laid-Open Publication No. 2008-132469, and so forth.

The raw material to be pulverized may be introduced into the pulverizing container 1 in advance, or may be introduced continuously through the introduction port 4 while carrying out the pulverization treatment. In view of the industrial continuous production, continuous introduction of the raw material to be pulverized into the pulverizing container 1 while carrying out the pulverization treatment is more preferable. In this treatment, the continuous process becomes possible by arranging the introduction port 4 in the upper part of one end of the pulverizing container and the discharge port 5 in the lower part of the opposite end to the introduction port 4. Before the discharge port 5, a slit that restricts the opening area of the opening part may be arranged in order to retain the raw material to be pulverized inside the pulverizing container 1 for sufficient pulverization. Meanwhile, the introduction port 4 and the discharge port 5 are not shown in FIG. 1 and FIG. 2.

Around the pulverizing container 1, a cooling jacket may be attached so that cooling may be carried out during pulverization. In addition, in the case that the raw material to be pulverized is affected by environment such as oxidation, a nozzle to purge with nitrogen or the like may be arranged on the pulverizing container 1 at the place near the introduction port 4 and/or the discharge port 5 of the pulverizing container.

Further, in order to avoid the damage in the pulverizing container 1 by collision between the pulverizing container 1 and the cylindrical medium 2, an iron steel plate with the cylindrical or curved shape may be inserted in the pulverizing container 1 as the lining. Even if the lining is damaged by collision between the lining and the cylindrical medium 2, the lining can be exchanged easily, so that this is preferable in view of the equipment maintenance Thickness of the lining is not particularly restricted; but in view of the sustainability thereof, the thickness is preferably 1 mm or more, more preferably 3 mm or more, or still more preferably 5 mm or more; and preferably 30 mm or less, more preferably 20 mm or less, or still more preferably 16 mm or less. From the same reason, thickness of the lining is preferably in the range of 1 to 30 mm, more preferably in the range of 3 to 20 mm, or still more preferably in the range of 5 to 16 mm.

1-1-2. Cylindrical Medium

As shown in FIG. 1 and FIG. 2, the cylindrical medium 2 is disposed inside the pulverizing container 1 so as to be vibratable in the state of almost parallel between the axis of the pulverizing container 1 and the central axis of the cylindrical medium 2 (hereinafter, this is sometimes referred to as "axis of the cylindrical medium"). Here, "disposal so as to be vibratable" means that the cylindrical medium 2 is disposed so as to be vibratable inside the pulverizing container 1 in the direction of within a plane that is almost perpendicular to the axis of the pulverizing container 1 when vibrating the pulverizing container 1.

In the vibration mill of the present invention, the cylindrical medium 2 is vibrated inside the pulverizing container 1 by vibrating the pulverizing container 1; and by vibration of the cylindrical medium 2, the pulverizing rate of the raw material to be pulverized by a plurality of the pulverizing media 3 which are disposed inside the cylindrical medium 2 so as to be vibratable is enhanced, so that not only the particle diameter of the raw material to be pulverized can be made smaller within a shorter period of time, but also a crystalline material such as cellulose can be changed to have lower crystallinity.

As shown FIG. 1 and FIG. 2, when a plurality of the pulverizing media 3 are disposed inside the cylindrical medium 2 so as to exist within a plane that is perpendicular to the axis of the cylindrical medium 2, the collision force of the pulverizing media 3 as well as the number of collisions among the pulverizing media 3 by themselves and between the cylindrical medium 2 and the pulverizing media 3 can be increased so that the pulverizing rate of the raw material to be pulverized can be enhanced. In order to enhance this pulverizing rate of the raw material to be pulverized, the ratio of the inner diameter of the cylindrical medium 2 in contacted with the pulverizing medium 3 to the outer diameter of the pulverizing medium 3 to be explained later (inner diameter of the cylindrical medium 2 in contacted with the pulverizing medium 3/outer diameter of the pulverizing medium 3) is 2.1 or more, preferably 2.2 or more, or more preferably 2.5 or more. In addition, the ratio of the inner diameter of the cylindrical medium 2 in contacted with the pulverizing medium 3 to the outer diameter of the pulverizing medium 3 is preferably 500 or less, more preferably 350 or less, still more preferably 100 or less, further still more preferably 50 or less, or the utmost preferably 25 or less.

In the present invention, the inner diameter of the cylindrical medium means twice as long as the shortest distance from the axis of the cylindrical medium to the inner plane of the cylindrical medium.

Though the pulverizing medium 3 will be explained later, the outer diameter of the pulverizing medium 3 means, if this medium is the rod-like medium 3a in the shape of a circular column or a prismatic column of polygonal with quadrangle or higher, the length of the longest straight line among the straight lines passing through the center of the circle or of the polygonal shape with quadrangle or higher in the cross-sectional view that is perpendicular to the longitudinal direction of the rod-like medium, the straight lines having their both ends on the peripherals of the cross-sectional view, that is, the length of the longest line means the diameter of a true circle if the cross-sectional view is a true circle, and the diameter of a ball in the case of the spherical medium 3b.

The material of construction of the cylindrical medium 2 is not particularly restricted. Illustrative example thereof includes a metal or a metal alloy such as an iron, an aluminum, an iron steel, and a stainless steel; and a ceramics such as a zirconium. The stainless steel and the iron steel may be treated by a treatment such as quenching.

In order to efficiently transmit the kinetic energy caused by vibration of the pulverizing container 1 to the cylindrical medium 2 when the cylindrical medium 2 is vibrated inside the pulverizing container 1 thereby increasing the mobility of the cylindrical medium 2, to further increase the collision force of the pulverizing media 3 that is present inside the cylindrical medium 2, and to increase the number of collisions among the pulverizing media 3 by themselves and between the cylindrical medium 2 and the pulverizing media 3, thereby enhancing the pulverizing rate of the raw material to be pulverized, the cylindrical medium 2 is preferably a trunk having the shape of a true circle, a quasi-circle such as an ellipse, or a polygonal with hexagonal or higher in the cross-sectional view of the inner space of the cylindrical medium 2, while a trunk having the shape of a true circle is more preferable. The outward surface and the inward surface of the cylindrical medium 2 may have projections; but in view of avoiding decrease of the pulverization efficiency due to abrasion of the cylindrical medium 2, it is preferable that there be no projections.

The difference between the inner diameter of the pulverizing container 1 and the outer diameter of the cylindrical medium 2 in contact with inside of the pulverizing container 1 (inner diameter of the pulverizing container 1–outer diameter of the cylindrical medium 2) is preferably 3 mm or more, more preferably 5 mm or more, still more preferably 8 mm or more, or further still more preferably 10 mm or more; and preferably 60 mm or less, more preferably 55 mm or less, still more preferably 50 mm or less, or further still more preferably 45 mm or less. Also, the difference between the inner diameter of the pulverizing container 1 and the outer diameter of the cylindrical medium 2 in contact with inside of the pulverizing container 1 is preferably in the range of 3 to 60 mm, more preferably in the range of 5 to 55 mm, still more preferably in the range of 8 to 50 mm, or further still more preferably in the range of 10 to 45 mm. If the difference between the outer diameter of the cylindrical medium 2 and the inner diameter of the pulverizing container 1 is within the above-mentioned range, the pulverizing rate of the raw material to be pulverized by the pulverizing medium 3 can be enhanced. In the case that a lining is inserted in the pulverizing container 1, the value obtained by further subtracting the length of twice the lining thickness from the difference between the inner diameter of the pulverizing container 1 and the outer diameter of the cylindrical medium 2 in contact with inside of the pulverizing container 1 is preferably within the above-mentioned range.

In the present invention, the outer diameter of the cylindrical medium means twice as long as the longest distance from the axis of the cylindrical medium to the outer surface of the cylindrical medium, that is, for example, in the case that the shape of the peripheral of the cross-sectional view that is perpendicular to the axis of the cylindrical medium is a true circle, this means the diameter of this true circle; in the case of an ellipse, this means the major diameter of the ellipse; and in the case of a polygonal, this means twice as long as the longest distance among the distances from the center of the polygonal to the tips thereof.

In view of the strength of the cylindrical medium 2, the ratio of the thickness of the cylindrical medium 2 to the outer diameter of the cylindrical medium 2 (thickness of the cylindrical medium 2/outer diameter of the cylindrical medium 2) is preferably 0.02 or more, more preferably 0.03 or more, still more preferably 0.05 or more, or further still more preferably 0.1 or more.

In order to increase the filling amount of the pulverizing media 3 in the cylindrical medium 2 thereby increasing the number of collisions among the pulverizing media 3 by themselves and between the cylindrical medium 2 and the pulverizing media 3 whereby enhancing the pulverizing rate of the raw material to be pulverized, the ratio of the thickness of the cylindrical medium 2 to the outer diameter of the cylindrical medium 2 is preferably 0.7 or less, more preferably 0.6 or less, or still more preferably 0.5 or less.

Here, "thickness of the cylindrical medium" means the thickness of the member to form the cylindrical medium, and does not mean the length in the direction of the axis of the cylindrical medium. If thickness of the cylindrical medium 2 is different depending on the parts thereof, thickness of the cylindrical medium 2 means the thickness of the thickest part thereof.

The length of the cylindrical medium 2 in the direction of the axis thereof is not particularly restricted so far as it is shorter than the length of the pulverizing container 1 in the direction of the axis thereof. However, in order to enhance the pulverizing rate of the raw material to be pulverized by increasing the contact area between the cylindrical medium 2 and the pulverizing medium 3, the ratio of the length of the cylindrical medium 2 in the direction of the axis thereof to the length of the columnar space in the direction of the axis thereof inside the pulverizing container 1 (length of the cylindrical medium 2 in the direction of the axis thereof/ length of the columnar space in the direction of the axis thereof inside the pulverizing container 1) is preferably 0.80 or more, more preferably 0.85 or more, or still more preferably 0.90 or more; and preferably 0.995 or less, more preferably 0.99 or less, still more preferably 0.985 or less, or further still more preferably 0.98 or less. Also, the ratio of the length of the cylindrical medium 2 in the direction of the axis thereof to the length of the columnar space in the direction of the axis thereof inside the pulverizing container 1 is preferably in the range of 0.80 to 0.995, more preferably in the range of 0.85 to 0.99, still more preferably in the range of 0.90 to 0.985, or further still more preferably in the range of 0.90 to 0.98.

If the pulverizing medium 3 comes out from inside of the cylindrical medium 2 to outside thereof when the pulverizing container 1 is vibrated, this disturbs the vibration of the cylindrical medium 2 in the pulverizing container 1. Accordingly, the difference between the length of the columnar space in the direction of the axis thereof inside the pulverizing container 1 and the length of the cylindrical medium 2 in the direction of the axis thereof is preferably shorter than the length of the rod-like medium 3a in the direction of the axis thereof in FIG. 1 or than the diameter of the spherical medium 3b in FIG. 2.

The cylindrical medium 2 may be divided into a plurality of them in the direction of the axis of the cylindrical medium 2. In FIG. 1 and FIG. 2, 2a shows one of the cylindrical media obtained by dividing the cylindrical medium 2 in the direction of the axis thereof. In order to make it easy to diffuse into the cylindrical medium 2 the raw material to be pulverized that is introduced into the pulverizing container 1 thereby enhancing the flowability of the pulverized material so that the raw material to be pulverized may be efficiently pulverized in the cylindrical medium 2, the cylindrical medium 2 is preferably divided into plurality of them in the direction of the axis of the cylindrical medium 2, as shown in FIG. 1 and FIG. 2. By so doing, the raw material to be pulverized present outside the cylindrical medium 2 can move from outside the cylindrical medium 2a to inside thereof through the space between the divided cylindrical media 2a thereby facilitating the diffusion thereof to inside the cylindrical medium 2a; and as a result, the pulverizing rate can be enhanced further.

The division distance of the cylindrical medium 2 (namely, length of the cylindrical medium 2a in the direction of the axis thereof) is not particularly restricted; but in view of the pulverization efficiency, the distance is preferably 100 mm or less, more preferably 60 mm or less, or still more preferably 30 mm or less. In order to secure the strength of the divided cylindrical medium 2a, the distance is preferably 3 mm or more, more preferably 5 mm or more, or still more preferably 10 mm or more.

In order to move and diffuse the raw material to be pulverized that is present outside the cylindrical medium 2 into the cylindrical medium 2 thereby efficiently pulverizing the raw material to be pulverized, a hole that penetrates through between the outer surface and the inner surface of the cylindrical medium 2 may be formed in the cylindrical medium 2. The shape of the hole is not particularly restricted, while for example a circular hole or a polyhedral hole of triangular or higher may be mentioned. Alternatively, a groove may be formed in the peripheral part of the cylindrical medium 2 in the direction perpendicular to the central axis to connect between the outer surface and the inner surface of the cylinder. In the case that the cylindrical medium 2 is divided into a plurality of them in the direction of the axis thereof, a groove similar to the peripheral part of the cylindrical medium 2 may be formed in the peripheral part of the cross-sectional view, i.e., the cylindrical medium 2a.

1-1-3. Pulverizing Medium

As shown in FIG. 1 and FIG. 2, the vibration mill of the present invention is provided with a plurality of the pulverizing media 3, wherein the pulverizing media 3 are disposed inside the cylindrical medium 2 so as to be vibratable. Shape of the pulverizing medium 3 may be the rod-like medium 3a as shown in FIG. 1 or the spherical medium 3b as shown in FIG. 2. Alternatively, a combination of these media may be used.

The material of construction of the pulverizing medium 3 is not particularly restricted. Illustrative example thereof includes a metal or a metal alloy such as an iron, an aluminum, an iron steel, and a stainless steel; and a ceramics such as a zirconium. The iron steel may be treated by a treatment such as quenching.

A plurality of the pulverizing media 3 are disposed inside the cylindrical medium 2 such that the integrated value of volumes of the pulverizing media 3 is more than 25% relative to the space volume inside the cylindrical medium 2 in contacted with the pulverizing medium 3. If the pulverizing medium 3 is only one, or if the integrated value of volumes of the pulverizing media 3 is 25% or less relative to the space volume inside the cylindrical medium 2, the pulverizing rate of the raw material to be pulverized becomes slower.

Here, the space volume inside the cylindrical medium 2 means the columnar space volume in the inner space of the cylindrical medium 2, the volume being obtained by multiplying the area of the cross-sectional view perpendicular to the axis of the cylindrical medium 2 with the length of the cylindrical medium 2 in the direction of the axis thereof. In addition, in the present invention, the integrated value of volumes of the pulverizing media 3 means the total sum of the volumes of a plurality of the pulverizing media 3 present in the container.

In order to suppress abrasion due to the collision with the cylindrical medium 2, the shape of the rod-like medium 3a is preferably a circular column or a prismatic column of polygonal with quadrangle or higher, while a circular column is more preferable, or a columnar shape having a true circular cross-sectional view is still more preferable.

In order to increase the collision force so as to enhance the pulverizing rate of the raw material to be pulverized, the outer diameter of the rod-like medium 3a is preferably 3 mm or more, more preferably 5 mm or more, or still more preferably 7 mm or more. In order to increase the number of the rod-like medium 3a thereby increasing the collision force as well as the number of collisions among the pulverizing media 3a by themselves and between the cylindrical medium 2 and the pulverizing media 3a whereby enhancing the pulverizing rate of the raw material to be pulverized, the outer diameter is preferably 60 mm or less, more preferably 50 mm or less, or still more preferably 45 mm or less.

Here, the outer diameter of the rod-like medium means the length of the straight line passing through the center of the cross-sectional view that is perpendicular to the longitudinal direction of the rod and having its both ends on the peripherals of the cross-sectional view; and thus, if the cross-sectional view is a true circle, it is the diameter of this true circle.

The length of the rod-like medium 3a is not particularly restricted so far as it is shorter than the length of the columnar space in the direction of the central axis thereof inside the pulverizing container 1; but in order to enhance the pulverizing rate of the raw material to be pulverized by increasing the contact area between the cylindrical medium 2 and the pulverizing medium 3, the ratio of the length of the rod-like medium 3a to the length of the columnar space in the direction of the axis thereof inside the pulverizing container 1 (length of the rod-like medium/length of the columnar space in the direction of the axis thereof inside the pulverizing container 1) is preferably 0.80 or more, more preferably 0.85 or more, or still more preferably 0.90 or more; and preferably 0.995 or less, more preferably 0.99 or less, still more preferably 0.985 or less, or further still more preferably 0.98 or less. Also, the length of the rod-like medium 3a is preferably in the range of 0.80 to 0.995, more preferably in the range of 0.85 to 0.99, still more preferably in the range of 0.90 to 0.985, or further still more preferably in the range of 0.90 to 0.98.

In order to make maintenance of the apparatus easy, the rod-like medium 3a may be divided into a plurality of them in the longitudinal direction.

In order to increase the collision force so as to enhance the pulverizing rate of the raw material to be pulverized, the outer diameter of the spherical medium 3b is preferably 3 mm or more, more preferably 5 mm or more, or still more preferably 7 mm or more. In order to increase the collision force of the spherical medium 3b as well as the number of collisions among the pulverizing media 3b by themselves and between the cylindrical medium 2 and the pulverizing media 3b thereby enhancing the pulverizing rate of the raw material to be pulverized, the above-mentioned outer diameter is preferably 60 mm or less, more preferably 50 mm or less, or still more preferably 45 mm or less.

In order to increase the number of collisions with the cylindrical medium 2 thereby enhancing the pulverizing rate of the raw material to be pulverized, the integrated value of volumes of the pulverizing media 3 relative to the space volume inside the cylindrical medium 2 in contacted with the pulverizing medium 3 is more than 25%, preferably 30% or more, or more preferably 40% or more. In addition, in order to increase the space to fill the raw material to be pulverized thereby enhancing the productivity, the integrated value of volumes of the pulverizing media 3 relative to the space volume inside the cylindrical medium 2 in contacted with the pulverizing media 3 is preferably 91% or less, more preferably 90% or less, or still more preferably 89% or less.

1-2. Second Embodiment

The second embodiment of the vibration mill according to the present invention will be explained by using FIG. 3 and FIG. 4.

Figure 3:
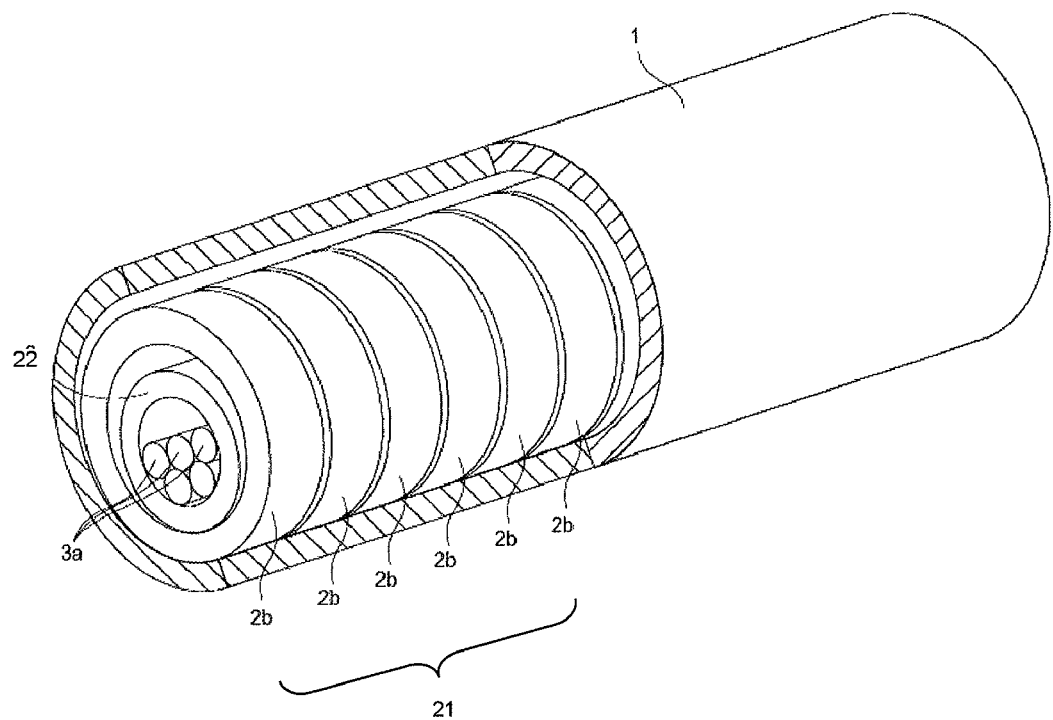
FIG. 3 This is a diagrammatic perspective view showing one example in which the columnar rod-like medium 3a is used as the pulverizing medium in the vibration mill according to the second embodiment of the present invention.
Figure 4:
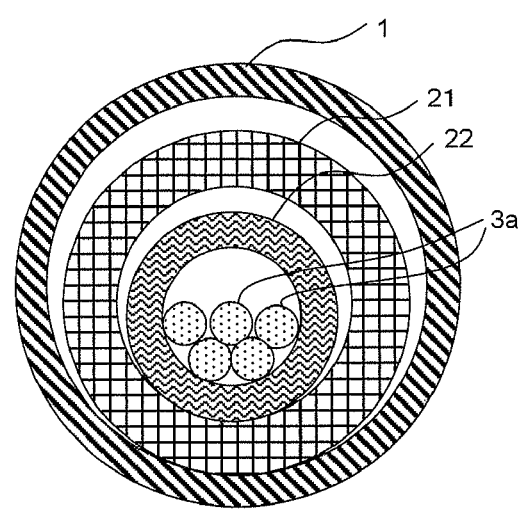
FIG. 4 This is a cross section view of the vibration mill shown in FIG. 3 dissected in the direction of the plane perpendicular to the central axis of the container.

FIG. 3 shows a diagrammatic perspective view of one example of the second embodiment of the vibration mill according to the present invention, and FIG. 4 shows a cross-sectional view of the vibration mill shown in FIG. 3 dissected in the direction perpendicular to the axis of the pulverizing container 1. In FIG. 3, in order to show the cylindrical media 21 and 22 as well as the pulverizing medium 3, which are disposed inside the pulverizing container 1, a part of the pulverizing container 1 and the holding part of the pulverizing container 1 are not shown in this figure.

As shown in FIG. 3 and FIG. 4, the second embodiment of the vibration mill according to the present invention has, as the cylindrical media, a plurality of the cylindrical media having different outer diameters and inner diameters, and is different from the first embodiment in that the plurality of the cylindrical media are disposed in the embedded structure in the state of almost parallel between the axis of the pulverizing container 1 and the axis of the cylindrical media.

In FIG. 3 and FIG. 4, the vibration mill provided with two kinds of the cylindrical media 21 and 22 having different outer diameters and inner diameters is shown as one example of the second embodiment. The cylindrical media 21 and 22 are disposed in the embedded state by inserting the cylindrical medium 22 whose outer diameter is smaller than the inner diameter of the cylindrical medium 21 into the cylindrical medium 21. Similarly, in the second embodiment, three or more kinds of the cylindrical media having different outer diameters and inner diameters may be used; and in this case, too, all of the cylindrical media are disposed in the pulverizing container 1 in the embedded state.

Meanwhile, all of the cylindrical media are disposed inside the pulverizing container 1 so as to be vibratable.

In all the cylindrical media in the second embodiment of the vibration mill according to the present invention, the material of construction, the shape, the thickness, and the preferable range of the length in the direction of the axis of the cylindrical media are the same as those of the first embodiment. In the second embodiment, too, similarly to the first embodiment, the cylindrical media are preferably divided in the direction of the axis thereof. In FIG. 3 and FIG. 4, 2b shows one cylindrical medium among the cylindrical media obtained by dividing the cylindrical medium 21 in the direction of the axis thereof, and 2c (not shown in the figure) shows one cylindrical medium among the cylindrical media obtained by dividing the cylindrical medium 22 in the direction of the axis thereof.

In the second embodiment of the vibration mill according to the present invention, "cylindrical medium in contact with the pulverizing medium" means the cylindrical medium disposed in the innermost side, namely, the cylindrical medium 22 in FIG. 3 and FIG. 4. In order to dispose a plurality of the pulverizing media 3 so as to be within a plane perpendicular to the axis of the cylindrical medium in the cylindrical medium 22 thereby increasing the collision force of the pulverizing media 3 as well as the number of collisions among the pulverizing media 3 by themselves and between the cylindrical medium 22 and the pulverizing media 3, the ratio of the inner diameter of the cylindrical medium 22 in contact with the pulverizing medium 3 to the outer diameter of the pulverizing medium 3 (inner diameter of the cylindrical medium 22 in contact with the pulverizing medium 3/the outer diameter of the pulverizing medium 3) is 2.1 or more, preferably 2.2 or more, or more preferably 2.5 or more. In addition, the ratio of the inner diameter of the cylindrical medium 22 to the outer diameter of the pulverizing medium 3 is preferably 500 or less, more preferably 350 or less, still more preferably 100 or less, further still more preferably 50 or less, or particularly preferably 25 or less.

Difference between the inner diameter of the pulverizing container 1 and the outer diameter of the cylindrical medium in contact with inside of the pulverizing container 1, namely the outer diameter of the cylindrical medium 21 shown in FIG. 3 and FIG. 4 (inner diameter of the pulverizing container 1–outer diameter of the cylindrical medium 21) is preferably 3 mm or more, more preferably 5 mm or more, still more preferably 8 mm or more, or further still more preferably 10 mm or more; and preferably 60 mm or less, more preferably 55 mm or less, still more preferably 50 mm or less, or further still more preferably 45 mm or less. Also, the difference between the inner diameter of the pulverizing container 1 and the outer diameter of the cylindrical medium in contact with inside of the pulverizing container 1 is preferably in the range of 3 to 60 mm, more preferably in the range of 5 to 55 mm, still more preferably in the range of 8 to 50 mm or more, or further still more preferably in the range of 10 to 45 mm. If the difference between the inner diameter of the pulverizing container 1 and the outer diameter of the cylindrical medium 21 is within the ranges shown above, the pulverizing rate of the raw material to be pulverized by the pulverizing medium 3 can be enhanced.

For the same reason as mentioned above, among the cylindrical media disposed in the embedded state, difference between the inner diameter of the cylindrical medium disposed outside and the outer diameter of the cylindrical medium in contact with inside of the foregoing cylindrical medium (in FIG. 3 and FIG. 4, inner diameter of the cylindrical medium 21–outer diameter of the cylindrical medium 22) is preferably 3 mm or more, more preferably 5 mm or more, still more preferably 8 mm or more, or further still more preferably 10 mm or more; and preferably 60 mm or less, more preferably 55 mm or less, still more preferably 50 mm or less, or further still more preferably 45 mm or less. Also, the difference between the inner diameter of the cylindrical medium disposed outside and the outer diameter of the cylindrical medium disposed in contact with inside of the foregoing cylindrical medium is preferably in the range of 3 to 60 mm, more preferably in the range of 5 to 55 mm, still more preferably in the range of 8 to 50 mm or more, or further still more preferably in the range of 10 to 45 mm.

Here, the pulverizing medium 3 is disposed inside the cylindrical medium in the innermost side of the cylindrical media that are disposed in the embedded state, namely inside the cylindrical medium 22 in FIG. 3 and FIG. 4, so as to be vibratable. The material of construction, the number, and the preferable shape of the pulverizing medium used in the second embodiment are the same as those in the first embodiment.

In addition, in the second embodiment of the vibration mill according to the present invention, the integrated value of volumes of the pulverizing media 3 relative to the space volume inside the cylindrical medium disposed in the innermost side of the cylindrical media that are disposed in the embedded state (cylindrical medium 22 in FIG. 3 and FIG. 4) is more than 25%, preferably 30% or more, or more preferably 40% or more. In order to increase the space for filling the raw material to be pulverized, the integrated value of volumes of the pulverizing media 3 relative to the space volume inside the cylindrical medium 22 in contact with the pulverizing medium 3 is preferably 91% or less, more preferably 90% or less, or still more preferably 89% or less.

2. Method for Manufacturing Pulverized Material

The method for manufacturing a pulverized material of the present invention is characterized by that the method has a pulverizing treatment process by using the vibration mill of the present invention to pulverize a raw material to be pulverized by vibrating the pulverizing container 1 after the raw material to be pulverized is introduced into the pulverizing container 1 of the vibration mill.

2-1. Raw Material to be Pulverized

The kind of the raw material to be pulverized that is pulverized by the method for manufacturing a pulverized material of the present invention is not particularly restricted; and illustrative thereof includes a metal, a metal oxide, an inorganic material, and an organic material. Among them, biomass raw materials, such as leaves and stems of a plant, a wooden material, a marine alga, a kitchen garbage, a pulp, a paper, an animal dead body, an animal excreta, a plant shell, a crustacean, and a plankton, can be pulverized especially efficiently. Illustrative example of the component of these biomass raw materials includes polysaccharides such as cellulose, hemicellulose, chitin, chitosan, and starch; and proteins such as lignin, fibroin, sericin, and collagen.

Among these biomass raw materials, when a cellulose-containing raw material which contains crystalline cellulose and a chitin-containing raw material which contains crystalline chitin are used as the raw material to be pulverized in the method for manufacturing a pulverized material of the present invention, lowering of the crystallinity thereof takes place along with pulverization, thereby leading to enhancement of the reactivity as a reaction raw material for a cellulose derivative; and thus, these are suitable as the raw material to be pulverized in the present invention.

Illustrative example of the foregoing cellulose-containing raw material includes wooden materials such as various kinds of wooden chips, pruned branches of various woods, timbers of forest thinning, tree branches, construction and demolition wastes, and factory wastes; pulps such as a wooden pulp produced from wooden materials and a cotton linter pulp obtained from fibers around a cotton seed; papers such as a newspaper, a carton box, a magazine, and a high quality paper; stems and leaves of a plant such as straws and corn stems; and plant shells such as a rice husk, a palm shell, and a coconut shell. Among them, a pulp and a wooden material are preferable.

In the cellulose-containing raw material used in the present invention as the raw material to be pulverized, the cellulose content (content of α-cellulose) in the remaining component after subtracting water from the cellulose-containing raw material is preferably 20% or more by mass, more preferably 40% or more by mass, still more preferably 60% or more by mass, further still more preferably 70% or more by mass, or even further still more preferably 75% or more by mass. The upper limit of the content of α-cellulose is 100% by mass. Here, the content of α-cellulose can be measured by the method described in EXAMPLES.

The cellulose in the cellulose-containing raw material comprises a crystalline portion and an amorphous portion. In the present invention, the cellulose I-type crystallinity index is calculated by the Segal method from the diffraction intensity by the X-ray diffraction method, and it can be defined by the following calculation equation (1). Specific measurement conditions for the X-ray diffraction will be shown in EXAMPLES.

$$\text{Cellulose I-type crystallinity index (\%)} = \{(I_{22.6} - I_{18.5})/I_{22.6}\} \times 100 \quad (1)$$

(In the equation, $I_{22.6}$ shows the diffraction intensity in the lattice plane (002 plane) (diffraction angle $2\theta=22.6°$) of the cellulose I-type crystal in the X-ray diffraction, and $I_{18.5°}$) shows the diffraction intensity of the amorphous portion (diffraction angle $2\theta=18.5°$).)

Here, the cellulose I-type means the crystal structure of a natural cellulose, and the cellulose I-type crystallinity index means the ratio of the cellulose I-type relative to totality of the crystalline area of the cellulose.

Cellulose I-type crystallinity index of the cellulose in the cellulose-containing raw material that is used as the raw material to be pulverized in the present invention is not particularly restricted. However, the pulverizing treatment to lower the cellulose crystallinity index is usually accompanied with the decrease in the degree of polymerization due to breakage of the cellulose chain. In order to obtain the pulverized cellulose-containing material having high degree of polymerization and in view of the raw material cost, it is preferable to use the cellulose-containing raw material having been less exposed to the pulverizing treatment to lower the crystallinity index. Accordingly, the cellulose I-type crystallinity index of the cellulose in the cellulose-containing raw material used as the raw material to be pulverized in the present invention is preferably more than 33%, more preferably 40% or more, still more preferably 50% or more, or further still more preferably 60% or more.

On the other hand, to obtain the cellulose-containing raw material having extremely high crystallinity index with the crystallinity index of more than 95% is difficult; and thus, the cellulose I-type crystallinity index of the cellulose in the cellulose-containing raw material is preferably 90% or less, or more preferably 85% or less.

From the above view point, the cellulose I-type crystallinity index of the cellulose in the cellulose-containing raw material is preferably more than 33%, more preferably in the range of 40 to 100%, still more preferably in the range of 50 to 90%, or further still more preferably in the range of 60 to 85%.

In the present invention, the raw material to be pulverized that is pulverized by the vibration mill may be treated by the cutting treatment, and the rough pulverizing treatment and/ or the drying treatment (these will be discussed later), though depending on the kind of the raw material.

2-2-1. Cutting Treatment

In the present invention, it is preferable that the raw material to be pulverized that is pulverized by the vibration mill be subjected to the cutting treatment in advance depending on the shape and the size thereof.

In the case that the raw material to be pulverized is the cellulose-containing raw material, the method for cutting treatment of the cellulose-containing raw material may be selected appropriately in accordance with the kind and the shape of the cellulose-containing raw material; and a method using, for example, one or more kinds of the cutting machine selected from a shredder, a slitter cutter, and a rotary cutter may be mentioned.

In the case that the cellulose-containing raw material in the sheet form is used, the cutting machine of a shredder or a slitter cutter is preferably used; and in view of productivity, the use of a slitter cutter is more preferable.

The slitter cutter is the cutter wherein cutting is done longitudinally by a roll cutter in a longitudinal direction along the longitudinal direction of the sheet to obtain narrow strips, which is then cut in a traverse direction along the widthwise direction by a fixed blade and a rotating blade; and by using this slitter cutter, the cellulose-containing raw material in the diced form can be obtained readily. Preferable example of the slitter cutter includes a Sheet Pelletizer manufactured by Horai Co., Ltd. and a Super Cutter manufactured by Ogino Seiki Co., Ltd. By using these machines, the cellulose-containing raw material in the sheet form can be cut to the pieces with the size of about 1 to 20 mm square on a side.

When wooden materials such as timbers of forest thinning, pruned branches of a wood, and construction and demolition wastes, or cellulose-containing raw materials other than those which are in the sheet form are cut to small pieces, it is preferable to use a rotary cutter. The rotary cutter is composed of a rotating blade and a screen; and by using this rotary cutter, the cellulose-containing raw material downsized by cutting to the pieces smaller than an opening of the screen can be readily obtained by a rotating blade. Meanwhile, as necessary, a fixed blade may be arranged so that cutting may be done by the rotating blade and the fixed blade.

In the case that the rotary cutter is used, the size of roughly pulverized material to be obtained can be controlled by changing the opening of the screen. The opening of the screen is preferably 1 mm or more, more preferably 2 mm or more, or still more preferably 3 mm or more; and preferably 70 mm or less, more preferably 50 mm or less, or still more preferably 40 mm or less. Also, the opening of the screen is preferably in the range of 1 to 70 mm, more preferably in the range of 2 to 50 mm, or still more preferably in the range of 3 to 40 mm. If the opening of the screen is 1 mm or more, a roughly pulverized material having a suitable bulk density can be obtained, so that a handling property thereof can be improved. If the opening of the screen is 70 mm or less, the raw material to be pulverized has a suitable size in the pulverizing treatment by the vibration mill followed thereafter, so that the load for the pulverization can be reduced.

The size of the cellulose-containing raw material obtained after the cutting treatment is preferably 1 or more mm square on a side, or more preferably 2 or more mm square on a side; and preferably 70 or less mm square on a side, or more preferably 50 or less mm square on a side. Also, the size of the cellulose-containing raw material obtained after the cutting treatment is preferably in the range of 1 to 70 mm square on a side, or more preferably in the range of 2 to 50 mm square on a side. When the cutting is done so as to give the size in the range of 1 to 70 mm square on a side, the drying treatment followed thereafter can be carried out efficiently and readily; and in addition, the load for pulverization can be reduced in the pulverizing treatment followed thereafter.

2-2-2. Rough Pulverizing Treatment

The raw material to be pulverized, preferably the raw material to be pulverized that is obtained by the above-mentioned cutting treatment, may be subjected to the rough pulverizing treatment if necessary.

The rough pulverizing treatment may be carried out by using a pulverizer of an impact type, which has been used often in the past to mechanically pulverize by the action of a compression shear force, such as for example, a cutter mill, a hammer mill, and a pin mill.

In the case that the raw material to be pulverized is the cellulose-containing raw material, in order to suppress change of the form of roughly pulverized material to a cotton-like form, to improve a handling property of the roughly pulverized material, and to increase the treatment capacity on the mass base, a treatment by using an extruding machine is preferable. The cellulose-containing raw material is made to powders by the action of the compression shear force by the extrusion treatment, whereby the bulk density thereof can be increased.

As to the extruding machine, any of a uniaxial type and a biaxial type may be used, while a biaxial extruding machine is preferable in view of the enhanced transportation capacity and so on.

The biaxial extruding machine is the extruding machine having two screws inserted inside the cylinder so as to be freely rotatable; and any heretofore known machine may be used. The rotation of the two screws may be in the same direction or in the opposite directions; however, in order to enhance the transportation capacity, the rotation in the same direction is preferable.

In addition, as to the engagement condition of the screws, any type of the extruding machines, such as the types of complete engagement, partial engagement, and non-engagement, may be used; however, in order to enhance the treatment capacity, the complete engagement type and the partial engagement type are preferable.

In order to apply a strong compression shear stress, the extruding machine is preferably provided with a so-called kneading disc part in any part of the screw.

The kneading disc part, which is comprised of a plurality of kneading discs, is formed by combining these discs so as to displace their positions continuously by a certain phase, for example by 90° each, so that by rotation of the screw the cellulose-containing raw material is forcibly passed through a narrow space between the kneading discs or between the kneading disc and the cylinder thereby rendering an extremely strong shearing force thereto. The screw is preferably constructed in such a way that the kneading disc part and a plurality of the screw segments are disposed alternately. In the case of a biaxial extruding machine, it is preferable that these two screws have the same structure.

As to the method for the rough pulverizing treatment, a continuous process, in which the above-mentioned cellulose-containing raw material, preferably the cellulose-containing raw material obtained by the cutting treatment as mentioned before, is charged into the extruding machine, is preferable. The shearing rate is preferably 10 $sec^{-1}$ or faster, more preferably 20 $sec^{-1}$ or faster, still more preferably 50 $sec^{-1}$ or faster, or especially preferably 500 $sec^{-1}$ or faster. Also, the shearing rate is more preferably 30000 $sec^{-1}$ or slower, or still more preferably 3000 $sec^{-1}$ or slower. Also, the shearing rate is more preferably in the range of 20 to 30000 $sec^{-1}$, still preferably in the range of 50 to 3000 $sec^{-1}$, or especially preferably in the range of 500 to 3000 $sec^{-1}$. If the shearing rate is 10 $sec^{-1}$ or faster, pulverization can take place effectively. There is no particular restriction as to other conditions, while the treatment temperature is preferably in the range of 5 to 200° C.

As to the number of the pass in the extruding machine, a sufficient effect may be obtained by one pass; but in the case that one pass is not sufficient, in view of lowering the crystallinity index and the degree of polymerization of the cellulose, it is preferable to carry out two or more passes. In view of the productivity, the pass number of 1 to 10 is preferable. By repeating the pass, coarse particles are pulverized so that the cellulose-containing raw material in the powder form having low fluctuation in the particle diameter can be obtained. When two or more passes are carried out, in view of the productivity, the treatment may be done by arranging a plurality of extruding machines in series.

In order to efficiently dispersing the cellulose-containing raw material into the vibration mill in the pulverizing treatment process that will be mentioned later, the median diameter of the cellulose-containing raw material obtained after the rough pulverizing treatment is preferably 0.3 mm or more, more preferably 0.35 mm or more, or still more preferably 0.4 mm or more; and preferably 1 mm or less, more preferably 0.7 mm or less, or still more preferably 0.6 mm or less. Also, the median diameter of the cellulose-containing raw material obtained after the rough pulverizing treatment is preferably in the range of 0.3 to 1 mm, more preferably in the range of 0.35 to 0.7 mm, or still more preferably in the range of 0.4 to 0.6 mm. If the median diameter of the cellulose-containing raw material obtained after the rough pulverizing treatment is 1 mm or less, the cellulose-containing raw material can be dispersed efficiently into the vibration mill, so that an intended particle diameter can be obtained without taking a long period of time for the pulverizing treatment that will be mentioned later. On the other hand, the lower limit of this median diameter is preferably 0.3 mm or more in view of the productivity. Meanwhile, the median diameter mentioned above can be measured by the method described in EXAMPLES.

2-2-3. Drying Treatment

If the raw material to be pulverized is a biomass raw material, especially if it is the cellulose-containing raw material, it is preferable that the raw material to be pulverized, preferably the raw material to be pulverized that is obtained by the cutting treatment and/or the rough pulverizing treatment as mentioned above, be subjected to a drying treatment before the pulverizing treatment by the vibration mill.

Generally usable biomass raw materials such as a commercially available pulp, leaves and stems of a plant, a wooden material, a marine alga, a kitchen garbage, a paper, an animal dead body, an animal excreta, a plant shell, a crustacean, and a plankton generally contain more than 5% by mass of water—usually in the range of about 5 to about 30% by mass. Accordingly, in the present invention, in order to enhance the pulverization efficiency, content of water in the biomass raw material is controlled at preferably 4.5% or less by mass by carrying out the drying treatment; more preferably 4% or less by mass, still more preferably 3% or less by mass, further still more preferably 2% or less by mass, or particularly preferably 1% or less by mass. If the content of water is 4.5% or less by mass, the pulverization efficiency is increased; and in the case that the raw material to be pulverized is a crystalline biomass raw material such as the cellulose-containing raw material and a chitin-containing raw material, the rate to lower the crystallinity is increased so that lowering of the crystallinity can be done efficiently by the short time pulverizing treatment; and in addition, in the case that the raw material to be pulverized is the cellulose-containing raw material, the cellulose I-type crystallinity index of the cellulose in the cellulose-containing raw material (this will be mentioned later) can be lowered. On the other hand, the lower limit of the content of water is, in view of productivity and drying efficiency, preferably 0.2% or more by mass, more preferably 0.3% or more by mass, or still more preferably 0.4% or more by mass. From these view points, the water content in the biomass raw material used in the manufacturing method of the present invention is preferably in the range of 0.2 to 4.5% by mass, more preferably in the range of 0.3 to 3% by mass, still more preferably in the range of 0.4 to 2% by mass, or further still more preferably in the range of 0.4 to 1% by mass.

The water content mentioned above can be measured by the method described in EXAMPLES.

As to the drying method, heretofore known methods may be used by appropriately selecting them; and illustrative example thereof includes a hot blow drying method, an indirect heat transfer drying method, a dried air drying method, a cold blow drying method, a microwave drying method, an infrared drying method, a sunlight drying method, a vacuum drying method, and a freeze drying method.

In the above-mentioned drying methods, a dryer appropriately selected from heretofore known dryers may be used. For example, dryers described in page 176 of "Outline of Powder Technology" (edited by The Association of Powder Process Industry and Engineering, JAPAN (Incorporated Association), published by The Information Center of Particle Technology, Japan in 1995) may be mentioned.

These drying methods and dryers each may be used singly or as a combination of two or more of them. The drying treatment may be done by any of a batch process and a continuous process; but in view of productivity, a continuous process is preferable.

As to the continuous dryer, a horizontal agitation dryer of an indirect heat transfer type is preferable in view of the thermal conductivity. Furthermore, a biaxial horizontal agitation dryer is preferable because of suppression in formation of fine powders and stability in continuous discharge.

As to the biaxial horizontal agitation dryer, a Nara Puddle Dryer manufactured by Nara Machinery Co., Ltd. may be used suitably.

Temperature in the drying treatment cannot be determined flatly in view of a drying method, a drying time, and so on; but it is preferably 10° C. or higher, more preferably 25° C. or higher, or still more preferably 50° C. or higher; and preferably 250° C. or lower, more preferably 180° C. or lower, or still more preferably 150° C. or lower. Also, temperature in the drying treatment is preferably in the range of 10 to 250° C., more preferably in the range of 25 to 180° C., or still more preferably in the range of 50 to 150° C. Time for the drying treatment is preferably 0.01 or more hours, or more preferably 0.02 or more hours; and preferably 2 or less hours, or more preferably 1 or less hours. Also, time for the drying treatment is preferably in the range of 0.01 to 2 hours, or more preferably in the range of 0.02 to 1 hours. The drying treatment may be done under reduced pressure if necessary; and the pressure is preferably 1 kPa or higher, or more preferably 50 kPa or higher; and preferably 120 kPa or lower, or more preferably 105 kPa or lower. Also, the pressure is preferably in the range of 1 to 120 kPa, or more preferably in the range of 50 to 105 kPa.

2-2-4. Pulverizing Treatment

The raw material to be pulverized, or the raw material to be pulverized that is treated as necessary by the cutting treatment, and the rough pulverizing treatment and/or the drying treatment as mentioned above, is pulverized by the vibration mill of the present invention. In the present invention, this treatment is sometimes referred to as "pulverizing treatment".

The method for manufacturing a pulverized material of the present invention has a pulverizing treatment process wherein the raw material to be pulverized is introduced into the pulverizing container 1 of the vibration mill of the present invention, whereby the raw material to be pulverized is pulverized by vibrating the pulverizing container 1. The method for this pulverizing treatment may be either a batch process in which the raw material to be pulverized is introduced inside the pulverizing container 1 of the vibration mill in advance, and then the pulverized material is discharged after a certain time of the pulverization treatment, or a continuous process in which the raw material to be pulverized is continuously introduced from the introduction port, while at the same time the pulverized material is continuously discharged from the discharge port. In view of industrial continuous production, the continuous process is preferable.

If the pulverizing treatment is done by the batch process, filled amount of the raw material to be pulverized during the pulverizing treatment is not particularly restricted; however, in order to vibrate the media smoothly, volume of the raw material to be pulverized that is filled in the pulverizing container 1 relative to the remaining volume after subtracting the volumes of the cylindrical medium and the pulverizing medium from the space volume of the pulverizing container 1 (hereinafter, this remaining volume is sometimes referred to as "practical volume inside the pulverizing container") is preferably 99% or less by volume, more preferably 95% or less by volume, still more preferably 90% or less by volume, further still more preferably 85% or less by volume, even further still more preferably 80% or less by volume.

On the other hand, if amount of the raw material to be pulverized is small, the collision between the cylindrical medium and the pulverizing medium that are not involved in pulverization, or the collision among these pulverizing media by themselves increases, thereby leading to decrease in pulverization efficiency. Accordingly, in order to improve the pulverization efficiency, the filled volume of the raw material to be pulverized relative to the practical volume inside the pulverizing container is preferably 1% or more by volume, more preferably 3% or more by volume, still more preferably 5% or more by volume, further still more preferably 10% or more by volume, or even further still more preferably 15% or more by volume.

Here, the volume of the raw material to be pulverized that is filled in the pulverizing container 1 means the volume that is obtained by dividing the weight of the filled raw material to be pulverized with the apparent specific gravity (tight) of the raw material to be pulverized.

If the pulverizing treatment is done by the continuous process, a preferable embodiment of the residing amount of the raw material to be pulverized inside the pulverizing container 1 is the same as the batch process except that "filled amount of the raw material to be pulverized" in the batch process is changed to "residing amount of the raw material to be pulverized inside the pulverizing container 1", and that "filled volume of the raw material to be pulverized" in the batch process is changed to "residing volume of the raw material to be pulverized inside the pulverizing container 1".

The vibration frequency and the vibration amplitude of the pulverizing container during the pulverizing treatment and the preferable ranges of them are the same as those mentioned before in the paragraphs relating to the pulverizing container.

The pulverizing treatment may be done until the pulverized material having an intended particle diameter or having an intended lowered crystallinity can be obtained. The necessary time for it changes depending on the amount to be treated, so that the time necessary for the pulverizing treatment cannot be determined flatly; but the time is usually in the range of 1 minute to 10 hours; however, in view of the particle diameter of the pulverized material to be obtained, amount of the material with lowered crystallinity during the pulverizing treatment, and the production efficiency, the time is preferably 2 minutes or longer, more preferably 3 minutes or longer, or still more preferably 5 minutes or longer; and preferably 3 hours or shorter, more preferably 1 hour or shorter, or still more preferably 30 minutes or shorter. Also, the time necessary for the pulverizing treatment is preferably in the range of 2 minutes to 3 hours, more preferably in the range of 3 minutes to 1 hour, or still more preferably in the range of 5 minutes to 30 minutes.

It is preferable that the pulverized material obtained by the manufacturing method of the present invention have its median particle diameter lowered to in the range of 1 to 80 μm. As to the intended median particle diameter, when the median diameter of the pulverized material becomes 80 μm or less, though depending on the raw material to be pulverized, not only the handling property thereof is improved, but also the specific surface area thereof is increased, thereby leading to enhancement in various chemical reactivities. The median diameter of the pulverized material can be obtained by the measurement method shown in EXAMPLES.

In the case that the raw material to be pulverized is the cellulose-containing raw material, when the median diameter of the cellulose-containing raw material becomes 80 μm or less, not only the handling property thereof is improved but also the specific surface area thereof is increased, so that the contact area with a reactant during the time of chemical reaction of the cellulose is increased, thereby leading to enhancement of the chemical reactivity thereof.

In the case that the raw material to be pulverized is the raw material that contains a crystalline material such as a cellulose-containing raw material and a chitin-containing raw material, lowering of the crystallinity thereof takes place along with pulverization thereof by the method for manufacturing the pulverized material according to the present invention, thereby leading to enhancement of the chemical reactivity of the pulverized material.

In the case that the raw material to be pulverized is the cellulose-containing raw material, the cellulose I-type crystallinity index—calculated from the before-mentioned calculation equation (1)—of the cellulose contained in the pulverized material that is obtained by the method of the present invention is lowered to preferably 33% or less.

The crystallinity index relates also to physical and chemical properties of the cellulose, and the higher the index is, the higher the crystallinity of the cellulose becomes, thereby leading to smaller amorphous portion; and thus, although hardness, density, and the like become higher, elongation, flexibility, solubility in water or a solvent, and chemical reactivity becomes lower.

If the I-type crystallinity index of the cellulose is 33% or less, chemical reactivity of the cellulose is high. Accordingly, the cellulose I-type crystallinity index of the cellulose in the pulverized material obtained by the manufacturing method of the present invention is preferably 33% or less, more preferably 25% or less, still more preferably 10% or less, or further still more preferably 5% or less.

If the pulverizing treatment is carried out by the method for manufacturing a pulverized material of the present invention, the cellulose I-type crystallinity index obtained from the calculation equation (1) may become a negative value depending on the pulverization time and the like. Lowering of the degree of polymerization by breakage of the cellulose chain takes place also by this pulverizing treatment; and thus, in order to obtain the pulverized cellulose-containing material having a further higher average degree of polymerization, the cellulose I-type crystallinity index of the cellulose in the pulverized material obtained by the manufacturing method of the present invention is preferably −30% or more, more preferably −20% or more, or still more preferably −10% or more.

With regard to the above-mentioned embodiments, the present invention discloses the following manufacturing methods.

(1) A method for manufacturing a pulverized material, wherein the method uses a vibration mill provided with:

a container having therein a columnar space with a central axis of the columnar space being disposed so as to be almost horizontal while the container being held so as to be vibratable in a direction of within a plane that is almost perpendicular to the central axis, a cylindrical medium disposed in the container so as to be vibratable, and a plurality of pulverizing media disposed inside the cylindrical medium so as to be vibratable; in the vibration mill, the ratio of an inner diameter of the cylindrical medium in contacted with the pulverizing medium to an outer diameter of the pulverizing medium (inner diameter of the cylindrical medium in contacted with the pulverizing medium/outer diameter of the pulverizing medium) is 2.1 or more, and the integrated value of volumes of the pulverizing media is more than 25% relative to a space volume inside the cylindrical medium in contacted with the pulverizing medium; and the method has a pulverizing treatment process of a raw material to be pulverized by vibrating the container after the raw material to be pulverized is introduced into the container of the vibration mill.

(2) The method for manufacturing a pulverized material according to (1), wherein the ratio of an inner diameter of the cylindrical medium in contacted with the pulverizing medium to an outer diameter of the pulverizing medium (inner diameter of the cylindrical medium in contacted with the pulverizing medium/outer diameter of the pulverizing medium) is 2.2 or more, or preferably 2.5 or more; and 500 or less, preferably 350 or less, more preferably 100 or less, still more preferably 50 or less, or further still more preferably 25 or less.

(3) The method for manufacturing a pulverized material according to (1) or (2), wherein the pulverizing medium is a rod-like medium having the outer diameter of 3 mm or more, preferably 5 mm or more, or still more preferably 7 mm or more; and 60 mm or less, preferably 50 mm or less, or more preferably 45 mm or less: and the pulverizing medium is a rod-like medium having the outer diameter preferably in the range of 3 to 60 mm, more preferably in the range of 5 to 50 mm, or still more preferably in the range of 7 to 45 mm.

(4) The method for manufacturing a pulverized material according to (3), wherein the ratio of the length of the rod-like medium to the length of the columnar space in the direction of the central axis thereof inside the pulverizing container (length of the rod-like medium/length of the columnar space in the direction of the central axis thereof inside the pulverizing container) is 0.80 or more, preferably 0.85 or more, or more preferably 0.90 or more; and 0.995 or less, preferably 0.99 or less, more preferably 0.985 or less, or still more preferably 0.98 or less: and preferably in the range of 0.80 to 0.995, more preferably in the range of 0.85 to 0.99, still more preferably in the range of 0.90 to 0.985, or further still more preferably in the range of 0.90 to 0.98.

(5) The method for manufacturing a pulverized material according to (1) or (2), wherein the pulverizing medium is a spherical medium having the outer diameter of 3 mm or more, preferably 5 mm or more, or still more preferably 7 mm or more; and 60 mm or less, preferably 50 mm or less, or more preferably 45 mm or less: and the pulverizing medium is a spherical medium having the outer diameter preferably in the range of 3 to 60 mm, more preferably in the range of 5 to 50 mm, or still more preferably in the range of 7 to 45 mm.

(6) The method for manufacturing a pulverized material according to any of (1) to (5), wherein the difference between the inner diameter of the container and the outer diameter of the cylindrical medium in contact with inside of the container (inner diameter of the container—outer diameter of the cylindrical medium in contact with inside of the container) is 3 mm or more, preferably 5 mm or more, more preferably 8 mm or more, or still more preferably 10 mm or more; and 60 mm or less, preferably 55 mm or less, more preferably 50 mm or less, or still more preferably 45 mm or less: and preferably in the range of 3 to 60 mm, more preferably in the range of 5 to 55 mm, still more preferably in the range of 8 to 50 mm, or further still more preferably in the range of 10 to 45 mm.

(7) The method for manufacturing a pulverized material according to any of (1) to (6), wherein the ratio of the length of the cylindrical medium in the direction of the central axis thereof to the length of the columnar space in the direction of the central axis thereof inside the container (length of the cylindrical medium in the direction of the central axis thereof/length of the columnar space in the direction of the central axis thereof inside the container) is 0.80 or more, preferably 0.85 or more, or more preferably 0.90 or more; and 0.995 or less, preferably 0.99 or less, more preferably 0.985 or less, or still more preferably 0.98 or less: and preferably in the range of 0.80 to 0.995, more preferably in the range of 0.85 to 0.99, still more preferably in the range of 0.90 to 0.985, or further still more preferably in the range of 0.90 to 0.98.

(8) The method for manufacturing a pulverized material according to any of (1) to (7), wherein the ratio of the thickness of the cylindrical medium to the outer diameter of the cylindrical medium (thickness of the cylindrical medium/outer diameter of the cylindrical medium) is 0.02 or more, preferably 0.03 or more, more preferably 0.05 or more, or still more preferably 0.1 or more; and 0.7 or less, preferably 0.6 or less, or more preferably 0.5 or less: and preferably in the range of 0.02 to 0.7, more preferably in the range of 0.03 to 0.6, still more preferably in the range of 0.05 to 0.5, or further still more preferably in the range of 0.1 to 0.5.

(9) The method for manufacturing a pulverized material according to any of (1) to (8), wherein the integrated value of volumes of the pulverizing media relative to the space volume inside the cylindrical medium in contacted with the pulverizing medium is 30% or more, or preferably 40% or more; and 91% or less, preferably 90% or less, or more preferably 89% or less.

(10) The method for manufacturing a pulverized material according to any of (1) to (9), wherein the vibration mill has, as the cylindrical medium, a plurality of the cylindrical media having different outer diameters and inner diameters, and the plurality of the cylindrical media are disposed in the embedded state in the container.

(11) The method for manufacturing a pulverized material according to (10), wherein, in the plurality of the cylindrical media disposed in the embedded state, difference between the inner diameter of the cylindrical medium disposed outside and the outer diameter of the cylindrical medium in contact with inside of the foregoing cylindrical medium is 3 mm or more, preferably 5 mm or more, more preferably 8 mm or more, or still more preferably 10 mm or more; and 60 mm or less, preferably 55 mm or less, more preferably 50 mm or less, or still more preferably 45 mm or less; and preferably in the range of 3 to 60 mm, more preferably in the range of 5 to 55 mm, still more preferably in the range of 8 to 50 mm or more, or further still more preferably in the range of 10 to 45 mm.

(12) The method for manufacturing a pulverized material according to any of (1) to (11), wherein the inner diameter of the container is 50 mm or more, preferably 80 mm or more, or more preferably 100 mm or more; and 1500 mm or less, preferably 1200 mm or less, or more preferably 1000 mm or less: and preferably in the range of 50 to 1500 mm, more preferably in the range of 80 to 1200 mm, or still more preferably in the range of 100 to 1000 mm.

(13) The method for manufacturing a pulverized material according to any of (1) to (12), wherein the length of the columnar space in the direction of the central axis thereof inside the container is 100 mm or more, preferably 120 mm or more, or more preferably 150 mm or more; and 10000 mm or less, preferably 8000 mm or less, or more preferably 6000 mm or less: and preferably in the range of 100 to 10000 mm, more preferably in the range of 120 to 8000 mm, or still more preferably in the range of 150 to 6000 mm.

(14) The method for manufacturing a pulverized material according to any of (1) to (13), wherein, in the pulverizing treatment process of the raw material to be pulverized by vibrating the container, the vibration frequency of the container is 8 Hz or more, preferably 10 Hz or more, or more preferably 12 Hz or more; and 40 Hz or less, preferably 35 Hz or less, or more preferably 30 Hz or less.

(15) The method for manufacturing a pulverized material according to any of (1) to (14), wherein, in the pulverizing treatment process of the raw material to be pulverized by vibrating the container, the vibration amplitude of the container is 5 mm or more, preferably 6 mm or more, or more preferably 7 mm or more; and 25 mm or less, preferably 20 mm or less, or more preferably 18 mm or less.

(16) The method for manufacturing a pulverized material according to any of (1) to (15), wherein the cylindrical medium is divided in the direction of the axis.

(17) The method for manufacturing a pulverized material according to (16), wherein the division distance of the cylindrical medium is 3 mm or more, preferably 5 mm or more, or more preferably 10 mm or more; and 100 mm or less, preferably 60 mm or less, or more preferably 30 mm or less: and preferably in the range of 3 to 100 mm, more preferably in the range of 5 to 60 mm, or still more preferably in the range of 10 to 30 mm.

(18) The method for manufacturing a pulverized material according to any of (1) to (17), wherein the raw material to be pulverized is a biomass raw material.

(19) The method for manufacturing a pulverized material according to any of (1) to (18), wherein the raw material to be pulverized is a cellulose-containing raw material.

(20) The method for manufacturing a pulverized material according to (19), wherein, in the cellulose-containing raw material, the cellulose content in the remaining component after subtracting water from the cellulose-containing raw material is 20% or more by mass, preferably 40% or more by mass, more preferably 60% or more by mass, or still more preferably 75% or more by mass; and 100% or less by mass: and in the range of 20 to 100% by mass, preferably in the range of 40 to 100% by mass, more preferably in the range of 60 to 100% by mass, or still more preferably in the range of 75 to 100% by mass.

(21) The method for manufacturing a pulverized material according to (19) or (20), wherein the cellulose-containing raw material is the cellulose-containing raw material whose cellulose I-type crystallinity index shown by the following calculation equation (1) is more than 33%, preferably 40% or more, more preferably 50% or more, or still more preferably 60% or more; and 90% or less, or preferably 85% or less: and preferably in the range of 40 to 100%, more preferably in the range of 50 to 90%, or still more preferably in the range of 60 to 85%, provided that, in the equation, $I_{22.6}$ shows the diffraction intensity in the lattice plane (002 plane) (diffraction angle)$2\theta=22.6°$) of the cellulose I-type crystal in the X-ray diffraction, and $I_{18.5}$ shows the diffraction intensity of the amorphous portion (diffraction angle $2\theta=18.5°$).

$$\text{Cellulose } I\text{-type crystallinity index (\%)}=\{(I_{22.6}-I_{18.5})/I_{22.6}\}\times 100 \quad (1)$$

(22) The method for manufacturing a pulverized material according to any of (19) to (21), wherein the pulverized material obtained by the pulverizing treatment of the cellulose-containing raw material is the pulverized material whose cellulose I-type crystallinity index shown by the calculation equation (1) is 33% or less, preferably 25% or less, more preferably 10% or less, or still more preferably 5% or less; and −30% or more, preferably −20% or more, or more preferably −10% or more: and preferably in the range of −30 to 33%, more preferably in the range of −20 to 25%, still more preferably in the range of −10 to 10%, or further still more preferably in the range of −10 to 5%.

(23) The method for manufacturing a pulverized material according to any of (18) to (22), wherein content of water in the biomass raw material is 4.5% or less by mass, preferably 4% or less by mass, more preferably 3% or less by mass, still more preferably 2% or less by mass, or further still more preferably 1% or less by mass; and 0.2% or more by mass, preferably 0.3% or more by mass, or more preferably 0.4% or more by mass: and preferably in the range of 0.2 to 4.5% by mass, more preferably in the range of 0.3 to 3% by mass, still more preferably in the range of 0.4 to 2% by mass, or further still more preferably in the range of 0.4 to 1% by mass.

(24) A vibration mill, wherein the vibration mill is provided with:

a container having therein a columnar space with a central axis of the columnar space being disposed so as to be almost horizontal while the container being held so as to be vibratable in a direction of within a plane that is almost perpendicular to the central axis, a cylindrical medium disposed in the container so as to be vibratable, and a plurality of pulverizing media disposed inside the cylindrical medium so as to be vibratable; and in the vibration mill, the ratio of an inner diameter of the cylindrical medium in contacted with the pulverizing medium to an outer diameter of the pulverizing medium (inner diameter of the cylindrical medium in contacted with the pulverizing medium/outer diameter of the pulverizing medium) is 2.1 or more, and the integrated value of volumes of the pulverizing media is more than 25% relative to a space volume inside the cylindrical medium in contacted with the pulverizing medium.

(25) The vibration mill according to (24), wherein the ratio of the inner diameter of the cylindrical medium in contacted with the pulverizing medium to the outer diameter of the pulverizing medium (inner diameter of the cylindrical medium in contacted with the pulverizing medium/outer diameter of the pulverizing medium) is 2.2 or more, or preferably 2.5 or more; and 500 or less, preferably 350 or less, more preferably 100 or less, still more preferably 50 or less, or further still more preferably 25 or less.

(26) The vibration mill according to (24) or (25), wherein the integrated value of volumes of the pulverizing media relative to the space volume inside the cylindrical medium in contacted with the pulverizing medium is more than 30% or more, or preferably 40% or more; and 91% or less, preferably 90% or less, or more preferably 89% or less.

EXAMPLES

The median diameter of the pulp used as the raw material to be pulverized and of the pulverized material as well as water content therein used in EXAMPLES, the I-type crystallinity index of the cellulose in the pulp and in the pulverized material of the pulp, the α-cellulose content in the pulp, and the apparent specific gravity (tight) of the pulp were measured by the methods shown below.

(1) Measurement of Median Diameter

The median diameter of the pulp or the chitin after the pulverizing treatment was measured by using the laser diffraction scattering particle diameter distribution measurement instrument LA-920 (manufactured by Horiba Ltd.). The measurement condition was as following: the sample was treated with an ultrasonic wave for 1 minute before measurement of the particle diameter, and the median diameter thereof on the volume bases was measured at 25° C. by using ethanol as the dispersion medium during the measurement. Specifically, before measurement of the median diameter, the pulp or the chitin after the pulverizing treatment was added into ethanol such that the concentration after the addition might become 70 to 95% as the transmittance thereof, and then it was dispersed by ultrasonic treatment for 1 minute; and thereafter, the measurement was done.

(2) Measurement of Water Content

Water content was measured by using the IR aquameter MOC-120H (manufactured by Shimadzu Corp.) at 120° C., wherein the point at which the weight change rate for 30 seconds became 0.05% or less was taken as the end point of the measurement.

(3) Calculation of Crystallinity Index

The I-type crystallinity index of the cellulose in the pulp or in the pulverized material of the pulp was calculated according to the before-mentioned calculation equation (1) by measuring the X-ray diffraction intensity of the pulp or of the pulverized material of the pulp by using the Rigaku RINT 2500VC X-RAY diffractometer (manufactured by Rigaku Corp.) with the following conditions.

That is, the measurement was done with the X-ray source of Cu/Kα-radiation, the tube voltage of 40 kV, the tube currency of 120 mA, the measurement range of 2θ=5 to 45°, and the X-ray scanning rate of 10°/minute. The sample for the measurement was the pellet having the area of 320 mm$^2$ and the thickness of 1 mm prepared by compression.

(4) Measurement of α-Cellulose Content

The α-cellulose content in the pulp was measured based on the method described in pages 95 to 96 of "Experimental Manual in Wood Science" edited by The Japan Wood Research Society (2000, published by Buneido Publishing Co., Ltd.).

That is, at first 10 to 20 g of a raw material was weighed, and then, after it was mixed with about 150 mL of a mixed solvent of ethanol and 1,2-dichloroethane with the volume ratio of 1:2, the resulting mixture was boiled for reflux in a Soxhlet extractor for 6 hours. The sample after the extraction was dried in a vacuum oven at 60° C. for 4 hours to obtain the defatted sample. The defatted sample thus obtained (2.5 g) was taken into a 300-mL Erlenmeyer flask and then mixed with about 150 mL of distilled water, 1.0 g of sodium hypochlorite, and 0.2 mL of acetic acid; and after the Erlenmeyer flak was loosely stoppered, it was heated in a water bath at 70 to 80° C. for 1 hour while shaking the ingredients at times. Thereafter, while keeping the temperature as it was, 1.0 g of sodium hypochlorite and 0.2 mL of acetic acid were added thereinto; and then, this mixture was heated in a water bath at 70 to 80° C. for 1 hour. Then, the same heating procedure with sodium hypochlorite and acetic acid as before was repeated for two times. The white material therein was collected by suction filtration by using a 1G-3 glass filter, washed with cold water and acetone, dried in a drying oven under vacuum at 105° C. for 6 hours, and then allowed to stand for cooling in a desiccator. The residual matter on the filter after cooling was used as the holocellulose sample. The amount of the holocellulose was obtained as the weight increase between before and after the filtration; and the holocellulose content B (% by mass) in the raw material was obtained by the following equation.

$B$=increased weight of the filter/2.5 g×100

After 1.0 g of the holocellulose sample and 25 mL of 17.5% aqueous sodium hydroxide were taken into a 300-mL beaker, the beaker was covered with a watch glass and then allowed to stand in a constant temperature bath at 20° C. for 3 minutes; and then, the sample was lightly crushed by a glass rod for 5 minutes to render a swollen state. The sample was again allowed to stand at 20° C. in the beaker after covering it with a watch glass; and then, after 30 minutes from the addition of the aqueous sodium hydroxide to the sample, 25 mL of distilled water was added thereinto. After the resulting mixture was stirred for exactly 1 minute, it was allowed to sand for 5 minutes, and then filtrated by suction by using a 1G-3 glass filter and washed with water at 20° C. quickly until the filtrate thereof became neutral. The substrate thus collected was added by 40 mL of 10% aqueous acetic acid further, and was filtrated by suction to remove the liquid present therein as much as possible. Then, it was washed by 1 liter of boiling water, dried in a drying oven at 105° C. under vacuum for 6 hours, and then allowed to stand for cooling in a desiccator. The residual matter on the filter after cooling was used as the α-cellulose sample. The amount of the α-cellulose was obtained as the weight increase between before and after the filtration; and the α-cellulose content C (% by mass) in the holocellulose was obtained by the following equation.

$C$=increased weight of the filter/1.0 g×100

Then, the obtained α-cellulose sample was dried at 575° C. for 12 hours. By measuring the weights before and after the drying, the amount of ash D (% by mass) was obtained by the following equation.

$D$=weight after drying/weight before drying×100

From the above results, the α-cellulose content E (% by mass) in the raw material without ash was obtained by the following equation.

$E=B\times C \div 100\times(1-D\div 100)$ (5) Measurement of Apparent Specific Gravity (Tight)

The apparent specific gravity (tight), the bulk density, was measured by using Powder Tester (manufactured by Hosokawa Micron Corp.). The volume was made to about 200 mL by attaching an appended cap to the upper part of the specified container (volume of 100 mL). In the case that the sample of pulp was used, the pulp was gently charged into the container by using a scoop to fill the container with the pulp. In the case that the sample of chitin was used, the sample was dropped into the container through a chute while vibrating a sieve having the opening of 710 μm. By using the tapping function of Powder Tester, tapping was done for 180 times during 180 seconds. After tapping, the cap was gently removed, and then, the extra sample on top of the 100-mL container was cut off; and then, the weight of the sample in the 100-mL container was measured to calculate the apparent specific gravity (tight).

Example 1 (Pulverization of Cellulose-Containing Raw Material by the Pulverizer According to the First Embodiment)

Cutting Treatment:

As the raw material to be pulverized, the cellulose-containing raw material, i.e., the wooden pulp in the sheet form (HV+, manufactured by Tembec Inc. (about 800 mm width×about 600 mm length×about 1.0 mm thickness; crystallinity index of 80%, α-cellulose content of 96% by mass, and water content of 8.0% by mass) was cut by using the scissors into the size of about 200 mm width×about 600 mm length×about 1.0 mm thickness, and then it was cut to the size of about 3 mm×about 1.5 mm×about 1.0 mm by using the Sheet Pelletizer SG(E)-220 (manufactured by Horai Co., Ltd.), a slitter cutter.

Drying Treatment

The pulp obtained by the cutting treatment was dried by using a biaxial horizontal agitation dryer (Nara Puddle Dryer NPD-1.6W (½), manufactured by Nara Machinery Co., Ltd.). The drying temperature was 140° C., wherein 8 kg of the pulp charged thereinto in advance was dried by a batch process for 60 minutes thereby leading to 0.8% by mass as the water content in the pulp. Thereafter, the dryer was tilted by 2° to dry the pulp by a continuous process. During this treatment, the charge rate of the pulp was 18 kg/hour. The water content in the dried pulp by this continuous process was also 0.8% by mass. The dried pulp thus obtained was kept in a bag made of aluminum until just before the pulverizing treatment to avoid absorption of a moisture during storage. The I-type crystallinity index of the cellulose in the pulp after the drying treatment was 81% as calculated from the intensity of the X-ray diffractometry.

Pulverizing Treatment

Inside the pulverizing container of the batch-type vibration mill MB-1 (total container volume of 3.58 liters with the inner diameter thereof being 142 mm and the length in the longitudinal direction thereof being 226 mm, manufactured by Chuoh Kakohki Co., Ltd.) was disposed the cylindrical medium made of a stainless steel with the outer diameter of 126 mm, the inner diameter of 98 mm, and the length of 210 mm in the direction of the axis thereof while uniformly divided into 10 in the direction of the axis thereof (namely the length of the individual cylindrical medium divided in the direction of the axis thereof is 21 mm), wherein the disposition thereof was made such that the direction of the axis of the cylindrical medium might be in parallel with the direction of the axis of the pulverizing container. In addition, as the pulverizing medium, 6 rod-like media made of a stainless steel and having the columnar form with the outer diameter of 30 mm and the length of 210 mm were disposed inside the cylindrical medium. At this time, the ratio of the integrated value of the volumes of the rod-like media to the space volume inside the cylindrical medium was 56.2%.

Further, 100 g of the pulp obtained by the drying treatment (apparent specific gravity (tight) of 0.18 g/mL) was charged inside the pulverizing container of the batch-type vibration mill, and then the pulverizing container was vibrated with the vibration amplitude of 8 mm and the vibration frequency of 20 Hz. After this vibration was carried out for 10 minutes, the pulverized material was recovered. The median diameter of the pulverized material thus obtained was 62.4 μm, and the I-type crystallinity index of the cellulose in the pulverized material was 2.0%.

Example 2 (Pulverization of Cellulose-Containing Raw Material by the Pulverizer According to the First Embodiment)

The pulverization was carried out by the same manner as that of Example 1, except that the pulverizing media disposed inside the cylindrical medium were changed to 55 rod-like media made of a stainless steel and having the columnar form with the outer diameter of 10 mm and the length of 210 mm. At this time, the ratio of the integrated value of the volumes of the rod-like media to the space volume inside the cylindrical medium was 57.3%. The median diameter of the pulverized material thus obtained was 70.9 μm, and the I-type crystallinity index of the cellulose in the pulverized material was 20.7%.

Example 3 (Pulverization of Cellulose-Containing Raw Material by the Pulverizer According to the First Embodiment)

The pulverization was carried out by the same manner as that of Example 1, except that the pulverizing media disposed inside the cylindrical medium were changed to 52 spherical media made of a stainless steel and having the diameter of 30 mm. At this time, the ratio of the integrated value of the volumes of the spherical media to the space volume inside the cylindrical medium was 46.4%. The median diameter of the pulverized material thus obtained was 79.0 μm, and the I-type crystallinity index of the cellulose in the pulverized material was 12.1%.

Example 4 (Pulverization of Cellulose-Containing Raw Material by the Pulverizer According to the First Embodiment)

The pulverization was carried out by the same manner as that of Example 1, except that the cylindrical medium disposed inside the pulverizing container was changed to the cylindrical medium made of a stainless steel with the outer diameter of 126 mm, the inner diameter of 98 mm, and the length of 210 mm in the direction of the axis thereof while not divided in the direction of the axis thereof. At this time, the ratio of the integrated value of the volumes of the rod-like media to the space volume inside the cylindrical medium was 56.2%. The median diameter of the pulverized material thus obtained was 68.4 μm, and the I-type crystallinity index of the cellulose in the pulverized material was −1.9%.

Example 5 (Pulverization of Cellulose-Containing Raw Material by the Pulverizer According to the First Embodiment)

The pulverization was carried out by the same manner as that of Example 1, except that the material of construction of the cylindrical medium disposed inside the pulverizing container was changed to aluminum, and that number of the rod-like media made of a stainless steel and having the columnar form with the outer diameter of 30 mm and the length of 210 mm was changed to 7. At this time, the ratio of the integrated value of the volumes of the rod-like media to the space volume inside the cylindrical medium was 65.6%. The median diameter of the pulverized material thus obtained was 63.6 μm, and the I-type crystallinity index of the cellulose in the pulverized material was −7.8%.

Example 6 (Pulverization of Chitin-Containing Raw Material by the Pulverizer According to the First Embodiment As the raw material to be pulverized, chitin (manufactured by Wako Pure Chemical Industries, Ltd.) was used. The median diameter of the raw material chitin was 170.8 μm, and the water content thereof was 8.6%. This chitin raw material was dried by using a drying oven (constant temperature vacuum dryer DRV 320DA, manufactured by ADVANTEC Co., Ltd.) such that water content of the chitin after drying might become 0.7%.)

The pulverization of 100 g of the dried chitin (apparent specific gravity (tight) of 0.20 g/mL) was carried out by the same manner as the pulverizing treatment of Example 1. The median diameter of the pulverized chitin thus obtained was 24.0 μm.

Example 7 (Pulverization of Cellulose-Containing Raw Material by the Pulverizer According to the Second Embodiment)

The pulverization was carried out by the same manner as that of Example 1, except that the cylindrical medium A made of a stainless steel with the outer diameter of 126 mm, the inner diameter of 98 mm, and the length of 210 mm in the direction of the axis thereof while uniformly divided into 10 in the direction of the axis thereof was disposed such that the direction of the axis of the cylindrical medium A might be in parallel with the direction of the axis of the pulverizing container, the cylindrical medium B made of a stainless steel with the outer diameter of 82 mm, the inner diameter of 54 mm, and the length of 210 mm in the direction of the axis thereof while uniformly divided into 10 in the direction of the axis thereof was disposed inside the cylindrical medium A such that the direction of the axis of the cylindrical medium B might be in parallel with the direction of the axis of the pulverizing container, and 3 rod-like media made of a stainless steel and having the columnar form with the outer diameter of 20 mm and the length of 210 mm were disposed inside the cylindrical medium B. At this time, the ratio of the integrated value of the volumes of the rod-like media to the space volume inside the cylindrical medium B was 41.2%. The median diameter of the pulverized material thus obtained was 63.4 μm, and the I-type crystallinity index of the cellulose in the pulverized material was 11.3%.

Example 8 (Pulverization of Cellulose-Containing Raw Material by the Pulverizer According to the First Embodiment)

The cutting treatment and the drying treatment were carried out in the same manner as those in Example 1 to obtain the dried pulp. Then, the pulverization treatment was carried out as follows: inside the pulverizing container of the batch-type vibration mill FV-10 (total container volume of 32.9 liters with the inner diameter thereof being 284 mm and the length in the longitudinal direction thereof being 520 mm, manufactured by Chuoh Kakohki Co., Ltd.) was disposed the cylindrical medium made of a stainless steel with the outer diameter of 267 mm, the inner diameter of 237 mm, and the length of 510 mm in the direction of the axis thereof while uniformly divided into 10 in the direction of the axis thereof (namely the length of the individual cylindrical medium divided in the direction of the axis thereof is 51 mm) such that the direction of the axis of the cylindrical medium might be in parallel with the direction of the axis of the pulverizing container. In addition, as the pulverizing medium, 30 rod-like media made of a stainless steel and having the columnar form with the outer diameter of 30 mm and the length of 510 mm were disposed inside the cylindrical medium. At this time, the ratio of the integrated value of the volumes of the rod-like media to the space volume inside the cylindrical medium was 48.1%. Then, 920 g of the pulp obtained by the drying treatment (apparent specific gravity (tight) of 0.18 g/mL) was charged inside the pulverizing container of the batch-type vibration mill, and then the pulverizing container was vibrated with the vibration amplitude of 8 mm and the vibration frequency of 20 Hz. After this vibration was carried out for 10 minutes, the pulverized material was recovered. The median diameter of the pulverized material thus obtained was 63.5 μm, and the I-type crystallinity index of the cellulose in the pulverized material was 26.0%.

Example 9 (Pulverization of Cellulose-Containing Raw Material by the Pulverizer According to the First Embodiment)

The pulverization was carried out by the same manner as that of Example 8, except that, as the cylindrical medium disposed inside the pulverizing container, the cylindrical medium—uniformly divided into 20 in the direction of the axis thereof—made of a stainless steel and having the outer diameter of 267 mm, the inner diameter of 237 mm, and the length of 510 mm in the direction of the axis thereof (namely the length of the individual cylindrical medium divided in the direction of the axis thereof is 25.5 mm) was disposed such that the direction of the axis of the cylindrical medium might be in parallel with the direction of the axis of the pulverizing container, and in addition, as the pulverizing medium, 46 rod-like media made of a stainless steel and having the columnar form with the outer diameter of 30 mm and the length of 510 mm were disposed inside the cylindrical medium, and further, the vibration frequency of the vibrating container was changed to 16 Hz. At this time, the ratio of the integrated value of the volumes of the rod-like media to the space volume inside the cylindrical medium was 73.7%. The median diameter of the pulverized material thus obtained was 63.0 μm, and the I-type crystallinity index of the cellulose in the pulverized material was 9.2%.

Comparative Example 1

The pulverization was carried out by the same manner as that of Example 1, except that the cylindrical medium was not disposed inside the pulverizing container while only 6 rod-like media made of a stainless steel and having a columnar form with the outer diameter of 30 mm and the length of 210 mm were disposed. The I-type crystallinity index of the cellulose in the pulverized material thus obtained was 68.5%. The pulverized material after the pulverization was in the form of chips having the particle diameter of about 1 mm by visual observation; and thus, the median diameter thereof could not be measured by the laser diffraction scattering particle diameter distribution measurement instrument.

Comparative Example 2

The pulverization was carried out by the same manner as that of Comparative Example 1, except that the number of the rod-like medium made of a stainless steel and having a columnar form with the outer diameter of 30 mm and the length of 210 mm that were disposed inside the pulverizing container was changed to 13. The median diameter of the pulverized material thus obtained was 84.0 μm, and the I-type crystallinity index of the cellulose in the pulverized material was 33.3%.

Comparative Example 3

The pulverization was carried out by the same manner as that of Comparative Example 1, except that the pulverizing media disposed inside the pulverizing container were changed to 117 of the rod-like media made of a stainless steel and having a columnar form with the outer diameter of 10 mm and the length of 210 mm. The I-type crystallinity index of the cellulose in the pulverized material thus obtained was 58.6%. The pulverized material after the pulverization was in the form of chips having the particle diameter of about 1 mm by visual observation; and thus, the median diameter thereof could not be measured by the laser diffraction scattering particle diameter distribution measurement instrument.

Comparative Example 4

The pulverization was carried out by the same manner as that of Comparative Example 1, except that the pulverizing media disposed inside the pulverizing container were changed to 115 of the spherical media made of a stainless steel with the diameter of 30 mm. The I-type crystallinity index of the cellulose in the pulverized material thus obtained was 64.2%. The pulverized material after the pulverization was in the form of chips having the particle diameter of about 1 mm by visual observation; and thus, the median diameter thereof could not be measured by the laser diffraction scattering particle diameter distribution measurement instrument.

Comparative Example 5

The pulverization was carried out by the same manner as that of Example 1, except that the cylindrical medium made of a stainless steel with the outer diameter of 126 mm, the inner diameter of 98 mm, and the length of 210 mm in the direction of the axis thereof while uniformly divided into 10 in the direction of the axis thereof was disposed such that the direction of the axis of the cylindrical medium might be in parallel with the direction of the axis of the pulverizing container, while the pulverizing media was not disposed inside the cylindrical medium. The median diameter of the pulverized material thus obtained was 93.7 μm, and the I-type crystallinity index of the cellulose in the pulverized material was 45.0%.

Comparative Example 6

The pulverization was carried out by the same manner as that of Example 1, except that the pulverizing media disposed inside the pulverizing container were changed to one rod-like medium made of a stainless steel and having a columnar form with the outer diameter of 30 mm and the length of 210 mm. At this time, the ratio of the integrated value of the volumes of the rod-like media to the space volume inside the cylindrical medium was 9.4%. The median diameter of the pulverized material thus obtained was 157.6 and the I-type crystallinity index of the cellulose in the pulverized material was 46.0%.

Comparative Example 7

The pulverization was carried out by the same manner as that of Example 1, except that the pulverizing media disposed inside the pulverizing container were changed to 2 rod-like medium made of a stainless steel with the outer diameter of 30 mm and the length of 210 mm. At this time, the ratio of the integrated value of the volumes of the rod-like media to the space volume inside the cylindrical medium was 18.7%. The median diameter of the pulverized material thus obtained was 109.1 μm, and the I-type crystallinity index of the cellulose in the pulverized material was 35.6%.

Comparative Example 8

Figure 5:
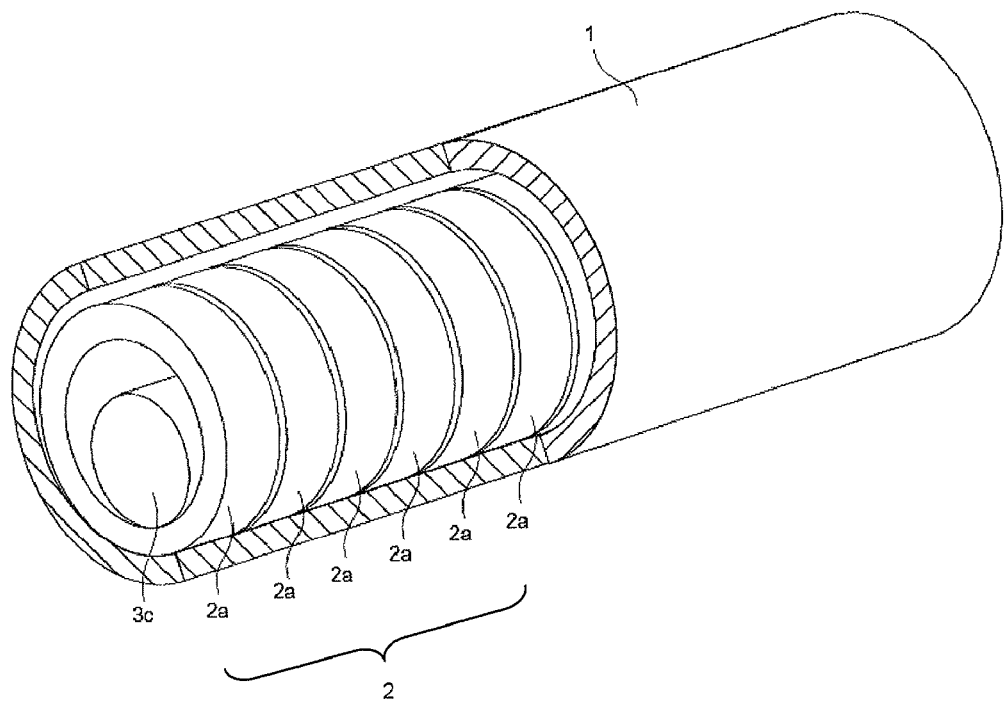
FIG. 5 This is the figure showing the configuration state of the columnar rod-like medium 3c divided in the direction of the axis thereof in the vibration mill used in Comparative Example 8.
Figure 6:
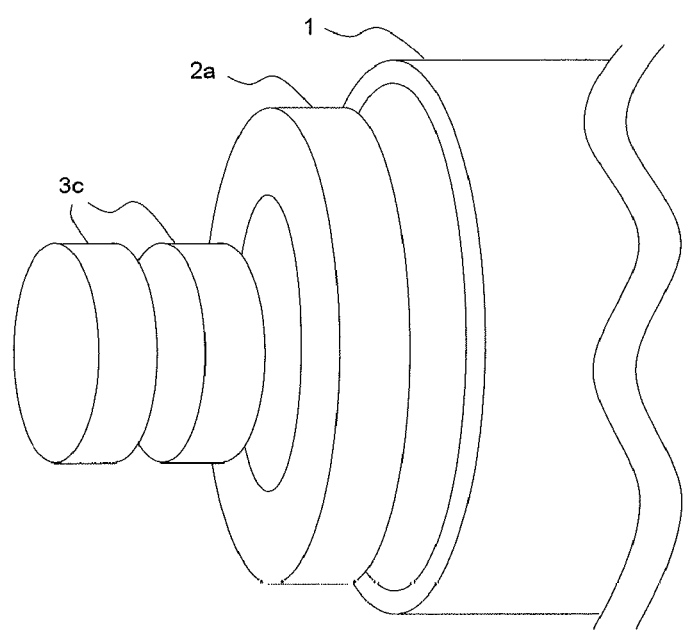
FIG. 6 This is the partial enlarged figure of the part of the cylindrical medium 2a divided in the direction of the axis thereof and the columnar rod-like medium 3c divided in the direction of the axis thereof that are taken out from inside of the container 1 in the vibration mill used in Comparative Example 8.

The pulverization was carried out by the same manner as that of Example 1, except that the pulverizing media disposed inside the pulverizing container were changed to one rod-like medium made of a stainless steel with the outer diameter of 74 mm and the length of 210 mm while uniformly divided into 10 in the direction of the axis thereof (FIG. 5 and FIG. 6). At this time, the ratio of the integrated value of the volumes of the rod-like media to the space volume inside the cylindrical medium was 57.0%. The median diameter of the pulverized material thus obtained was 88.1 μm, and the I-type crystallinity index of the cellulose in the pulverized material was 36.6%.

TABLE 1

| | | Pulverizing container | | | Cylindrical medium | | | | |
| --- | --- | --- | --- | --- | --- | --- | --- | --- | --- |
| | Raw material to be pulverized | Inner diameter mm | Vibration amplitude mm | Vibration frequency Hz | Outer diameter mm | Inner diameter mm | Material of construction | Length in axial direction mm | Division number (axial direction) Number |
| Example 1 | Wooden pulp | 142 | 8 | 20 | 126 | 98 | Stainless | 210 | 10 |
| Example 2 | Wooden pulp | 142 | 8 | 20 | 126 | 98 | Stainless | 210 | 10 |
| Example 3 | Wooden pulp | 142 | 8 | 20 | 126 | 98 | Stainless | 210 | 10 |
| Example 4 | Wooden pulp | 142 | 8 | 20 | 126 | 98 | Stainless | 210 | 1 |
| Example 5 | Wooden pulp | 142 | 8 | 20 | 126 | 98 | Aluminum | 210 | 10 |
| Example 6 | Chitin | 142 | 8 | 20 | 126 | 98 | Stainless | 210 | 10 |
| Example 7 *2 | Wooden pulp | 142 | 8 | 20 | 126 | 98 | Stainless | 210 | 10 |
| | | | | | 82 | 54 | Stainless | 210 | 10 |
| Example 8 | Wooden pulp | 284 | 8 | 20 | 267 | 237 | Stainless | 510 | 10 |
| Example 9 | Wooden pulp | 284 | 8 | 16 | 267 | 237 | Stainless | 510 | 20 |
| Comparative Example 1 | Wooden pulp | 142 | 8 | 20 | | | Not used | | |
| Comparative Example 2 | Wooden pulp | 142 | 8 | 20 | | | Not used | | |
| Comparative Example 3 | Wooden pulp | 142 | 8 | 20 | | | Not used | | |
| Comparative Example 4 | Wooden pulp | 142 | 8 | 20 | | | Not used | | |
| Comparative Example 5 | Wooden pulp | 142 | 8 | 20 | 126 | 98 | Stainless | 210 | 10 |

TABLE 1-continued

| | | | | | | | | | |
|---|---|---|---|---|---|---|---|---|---|
| Comparative Example 6 | Wooden pulp | 142 | 8 | 20 | 126 | 98 | Stainless | 210 | 10 |
| Comparative Example 7 | Wooden pulp | 142 | 8 | 20 | 126 | 98 | Stainless | 210 | 10 |
| Comparative Example 8 | Wooden pulp | 142 | 8 | 20 | 126 | 98 | Stainless | 210 | 10 |

| | Pulverizing medium | | | | Inner diameter of cylindrical medium/outer diameter of pulverizing medium | Physical properties of pulverized material | |
|---|---|---|---|---|---|---|---|
| | Form | Outer diameter (diameter) mm | Length in longitudinal direction mm | Number Number | Space volume ratio *1 % | Crystallinity index % | Average particle diameter μm |
| Example 1 | Rod-like | 30 | 210 | 6 | 56.2 | 3.3 | 2.0 | 62.4 |
| Example 2 | Rod-like | 10 | 210 | 55 | 57.3 | 9.8 | 20.7 | 70.9 |
| Example 3 | Spherical | 30 | — | 52 | 46.4 | 3.3 | 12.1 | 79.0 |
| Example 4 | Rod-like | 30 | 210 | 6 | 56.2 | 3.3 | −1.9 | 68.4 |
| Example 5 | Rod-like | 30 | 210 | 7 | 65.6 | 3.3 | −7.8 | 63.6 |
| Example 6 | Rod-like | 30 | 210 | 6 | 56.2 | 3.3 | — | 24.0 |
| Example 7 *2 | Rod-like | 20 | 210 | 3 | 41.2 | —<br>2.7 | 11.3 | 63.4 |
| Example 8 | Rod-like | 30 | 510 | 30 | 48.1 | 7.9 | 26.0 | 63.5 |
| Example 9 | Rod-like | 30 | 510 | 46 | 73.7 | 7.9 | 9.2 | 63.0 |
| Comparative Example 1 | Rod-like | 30 | 210 | 6 | — | — | 68.5 | Unmeasurable *3 |
| Comparative Example 2 | Rod-like | 30 | 210 | 13 | — | — | 33.3 | 84.0 |
| Comparative Example 3 | Rod-like | 10 | 210 | 117 | — | — | 58.6 | Unmeasurable *3 |
| Comparative Example 4 | Spherical | 30 | — | 115 | — | — | 64.2 | Unmeasurable *3 |
| Comparative Example 5 | Not used | | | | — | — | 45.0 | 93.7 |
| Comparative Example 6 | Rod-like | 30 | 210 | 1 | 9.4 | 3.3 | 46.0 | 157.6 |
| Comparative Example 7 | Rod-like | 30 | 210 | 2 | 18.7 | 3.3 | 35.6 | 109.1 |
| Comparative Example 8 | Rod-like | 74 | 210 | 1 *4 | 57.0 | 1.3 | 36.6 | 88.1 |

Notes
*1 Space volume ratio = (Integrated value of volumes of the pulverizing media)/(space volume of inside the cylindrical medium)
*2 Two kinds of cylindrical media having different outer diameters and inner diameters are used in the embedded state.
*3 Measurement was impossible because the pulverized material was in the form of chips having a too large particle diameter.
*4 The rod-like medium was divided into 10 in the direction of the axis thereof.

INDUSTRIAL APPLICABILITY

According to the vibration mill and the method for manufacturing a pulverized material using the vibration mill of the present invention, a pulverized material having a small diameter can be obtained efficiently within a short period of time, and in addition, a crystalline raw material to be pulverized can be changed to have low crystallinity within a short period of time, so that this method has good productivity and is useful as the industrial manufacturing method. In the case that the raw material to be pulverized is a biomass raw material, the obtained low-crystalline biomass having a small diameter is particularly useful for a cosmetic, a food stuff, a biomass material, and an industrial raw material such as a resin-reinforcing material.

EXPLANATION OF REFERENCE NUMERALS

1. Pulverizing container
2, 21, 22 Cylindrical medium
2a, 2b Cylindrical medium divided in the direction of the axis thereof
3a Columnar rod-like medium
3b Spherical medium
3c Columnar rod-like medium divided in the direction of the axis thereof

The invention claimed is:

1. A method for manufacturing a pulverized material, wherein the method uses a vibration mill provided with:
    a container having therein a columnar space with a central axis of the columnar space being disposed so as to be almost horizontal while the container being held so as to be vibratable in a direction of within a plane that is almost perpendicular to the said central axis,
    a cylindrical medium disposed in the container so as to be vibratable, and
    a plurality of pulverizing media disposed inside the cylindrical medium so as to be vibratable; in the said vibration mill
    the ratio of an inner diameter of the cylindrical medium in contact with the pulverizing medium to an outer diameter of the pulverizing medium is 2.1 or more, and
    the integrated value of volumes of the pulverizing media is more than 25% relative to a space volume inside the cylindrical medium in contact with the pulverizing medium; and
    the method has a pulverizing treatment process of a raw material to be pulverized by vibrating the container after the said raw material to be pulverized is introduced into the container of the vibration mill.

2. The method for manufacturing a pulverized material according to claim 1, wherein the pulverizing medium is a rod-like medium having the outer diameter in the range of 3 to 60 mm.

3. The method for manufacturing a pulverized material according to claim 2, wherein the ratio of the length of the rod-like medium to the length of the columnar space in the direction of the central axis thereof inside the pulverizing container is in the range of 0.80 to 0.995.

4. The method for manufacturing a pulverized material according to claim 1, wherein the pulverizing medium is a spherical medium having the outer diameter in the range of 3 to 60 mm.

5. The method for manufacturing a pulverized material according to claim 1, wherein the difference between the inner diameter of the container and the outer diameter of the cylindrical medium in contact with inside of the container is in the range of 3 to 60 mm.

6. The method for manufacturing a pulverized material according to claim 1, wherein the ratio of the length of the cylindrical medium in the direction of the central axis thereof to the length of the columnar space in the direction of the central axis thereof inside the container is in the range of 0.80 to 0.995.

7. The method for manufacturing a pulverized material according to claim 1, wherein the ratio of the thickness of the cylindrical medium to the outer diameter of the said cylindrical medium is in the range of 0.02 to 0.7.

8. The method for manufacturing a pulverized material according to claim 1, wherein the vibration mill has, as the cylindrical medium, a plurality of the cylindrical media having different outer diameters and inner diameters, and the said plurality of the cylindrical media are disposed in the embedded state in the container.

9. The method for manufacturing a pulverized material according to claim 8, wherein, in the plurality of the cylindrical media disposed in the embedded state, difference between the inner diameter of the cylindrical medium disposed outside and the outer diameter of the cylindrical medium in contact with inside of the foregoing cylindrical medium is in the range of 3 to 60 mm.

10. The method for manufacturing a pulverized material according to claim 1, wherein the raw material to be pulverized is a biomass raw material.

11. The method for manufacturing a pulverized material according to claim 10, wherein the biomass raw material to be pulverized is a cellulose-containing raw material.

12. The method for manufacturing a pulverized material according to claim 11, wherein, in the cellulose-containing raw material, the cellulose content in the remaining component after subtracting water from the said cellulose-containing raw material is 20% or more by mass, and the said cellulose-containing raw material is the cellulose-containing raw material whose cellulose I-type crystallinity index shown by the following calculation equation (1) is more than 33%, provided that, in the equation, $I_{22.6}$ shows the diffraction intensity in the lattice plane (002 plane) where the diffraction angle 2θ=22.6° of the cellulose I-type crystal in the X-ray diffraction, and $I_{18.5}$ shows the diffraction intensity of the amorphous portion where the diffraction angle 2θ=18.5°

Cellulose I-type crystallinity index (%)={$(I_{22.6}-I_{18.5})/I_{22.6}$}×100     (1).

13. The method for manufacturing a pulverized material according to claim 11, wherein the pulverized material obtained by the pulverizing treatment of the cellulose-containing raw material is the pulverized material whose cellulose I-type crystallinity index shown by the calculation equation (1) is 33% or less.

14. The method for manufacturing a pulverized material according to claim 10, wherein content of water in the biomass raw material is in the range of 0.2 to 4.5% by mass.

15. The method for manufacturing a pulverized material according to claim 1, wherein the ratio of an inner diameter of the cylindrical medium in contact with the pulverizing medium to an outer diameter of the pulverizing medium is 500 or less.

16. The method for manufacturing a pulverized material according to claim 1, wherein the integrated value of volumes of the pulverizing media relative to the space volume inside the cylindrical medium in contact with the pulverizing medium is 91% or less.

17. The method for manufacturing a pulverized material according to claim 1, wherein the cylindrical medium is divided in the direction of the axis.

18. The method for manufacturing a pulverized material according to claim 17, wherein the division distance of the cylindrical medium is in the range of 3 to 100 mm.

19. The method for manufacturing a pulverized material according to claim 1, wherein, in the pulverizing treatment process of the raw material to be pulverized by vibrating the container, the vibration frequency of the container is in the range of 8 to 35 Hz.

20. A vibration mill, wherein the said vibration mill is provided with:
a container having therein a columnar space with a central axis of the columnar space being disposed so as to be almost horizontal while the container being held so as to be vibratable in a direction of within a plane that is almost perpendicular to the said central axis,
a cylindrical medium disposed in the container so as to be vibratable, and
a plurality of pulverizing media disposed inside the cylindrical medium so as to be vibratable; and in the said vibration mill,
the ratio of an inner diameter of the cylindrical medium in contacted with the pulverizing medium to an outer diameter of the pulverizing medium is 2.1 or more, and
the integrated value of volumes of the pulverizing media is more than 25% relative to a space volume inside the cylindrical medium in contacted with the pulverizing medium.

* * * * *